(12) United States Patent
Lee et al.

(10) Patent No.: US 9,026,947 B2
(45) Date of Patent: May 5, 2015

(54) MOBILE TERMINAL AND METHOD FOR DISPLAYING AN IMAGE IN A MOBILE TERMINAL

(75) Inventors: Choonsik Lee, Seoul (KR); Donghyun Lee, Incheon (KR)

(73) Assignee: LG Electronics Inc., Seoul (KR)

( * ) Notice: Subject to any disclaimer, the term of this patent is extended or adjusted under 35 U.S.C. 154(b) by 795 days.

(21) Appl. No.: 13/014,626

(22) Filed: Jan. 26, 2011

(65) Prior Publication Data

US 2011/0275415 A1 Nov. 10, 2011

(30) Foreign Application Priority Data

May 6, 2010 (KR) ........................ 10-2010-0042374

(51) Int. Cl.
*G06F 3/048* (2013.01)
*G06F 3/0481* (2013.01)
*H04N 13/02* (2006.01)
(Continued)

(52) U.S. Cl.
CPC ........ *G06F 3/04815* (2013.01); *H04N 13/0278* (2013.01); *H04N 5/23216* (2013.01); *H04N 5/23296* (2013.01); *G06F 1/1686* (2013.01)

(58) Field of Classification Search
CPC ........ G01C 21/3602; G01C 21/3626–21/3682; G06F 3/005; G06F 3/0346; G06F 3/048–3/04817; G06F 17/30241; G06F 17/30861–17/3087; G06F 2200/1637; G06F 2203/04803; G06F 1/1686; G06F 1/169
USPC ........ 345/1.1–699; 382/100–325; 455/1–899; 701/1–541; 715/800, 850–852
See application file for complete search history.

(56) References Cited

U.S. PATENT DOCUMENTS

| 6,037,936 A * | 3/2000 | Ellenby et al. ................ 715/764 |
| 6,202,026 B1 * | 3/2001 | Nimura et al. ................ 701/455 |
| 8,244,462 B1 * | 8/2012 | Zhu ................................ 701/408 |

(Continued)

FOREIGN PATENT DOCUMENTS

| CN | 101078634 | 11/2007 |
| CN | 101109646 | 1/2008 |

(Continued)

OTHER PUBLICATIONS

State Intellectual Property Office of the People's Republic of China Application Serial No. 201110082582.9, Office Action dated Mar. 5, 2013, 12 pages.

(Continued)

*Primary Examiner* — William Bashore
*Assistant Examiner* — Linda Huynh
(74) *Attorney, Agent, or Firm* — Lee, Hong, Degerman, Kang & Waimey

(57) ABSTRACT

A mobile terminal is provided that includes a camera module for capturing an image; a position-location module for obtaining first information regarding a current location of the mobile terminal; a display unit for displaying the captured image and a viewpoint indicator on the captured image, the viewpoint indicator displayed at a point corresponding to the obtained first information and indicating a direction; a user input unit for receiving an input of a shift command signal for shifting the display of the viewpoint indicator; and a controller for controlling the display unit to shift the display of the viewpoint indicator to a point corresponding to the shift command signal and to display second information regarding at least one entity oriented about the mobile terminal along the indicated direction.

17 Claims, 24 Drawing Sheets

(51) Int. Cl.
*H04N 5/232* (2006.01)
*G06F 1/16* (2006.01)

(56) References Cited

U.S. PATENT DOCUMENTS

| | | | | |
|---|---|---|---|---|
| 8,566,029 | B1* | 10/2013 | Lopatenko et al. | 701/426 |
| 2003/0018427 | A1* | 1/2003 | Yokota et al. | 701/208 |
| 2004/0012506 | A1* | 1/2004 | Fujiwara et al. | 340/995.1 |
| 2006/0026170 | A1* | 2/2006 | Kreitler et al. | 707/10 |
| 2006/0229807 | A1* | 10/2006 | Sheha et al. | 701/209 |
| 2007/0035563 | A1 | 2/2007 | Biocca et al. | |
| 2007/0162942 | A1* | 7/2007 | Hamynen et al. | 725/105 |
| 2008/0291201 | A1* | 11/2008 | Lafon | 345/427 |
| 2009/0083660 | A1* | 3/2009 | Lettau | 715/784 |
| 2009/0216446 | A1 | 8/2009 | Ma et al. | |
| 2009/0305820 | A1* | 12/2009 | Denton et al. | 473/407 |
| 2009/0318168 | A1* | 12/2009 | Khosravy et al. | 455/456.3 |
| 2010/0328344 | A1* | 12/2010 | Mattila et al. | 345/633 |
| 2011/0010082 | A1* | 1/2011 | Wilson et al. | 701/200 |
| 2011/0164163 | A1* | 7/2011 | Bilbrey et al. | 348/333.01 |

FOREIGN PATENT DOCUMENTS

| | | |
|---|---|---|
| CN | 101231564 | 7/2008 |
| CN | 101470008 | 7/2009 |
| CN | 101583842 | 11/2009 |

OTHER PUBLICATIONS

Google Inc., "Navigate your way through user photos in Street View," XP055002660, Feb. 2010, 4 pages.
European Patent Office Application Serial No. 11001862.9, Search Report dated Feb. 13, 2015, 9 pages.

* cited by examiner

MOBILE TERMINAL AND METHOD FOR DISPLAYING AN IMAGE IN A MOBILE TERMINAL

Pursuant to 35 U.S.C. §119(a), this application claims the benefit of earlier filing date and right of priority to Korean Application No. 10-2010-0042374, filed on May 6, 2010, the contents of which are hereby incorporated by reference herein in their entirety.

FIELD OF THE INVENTION

Embodiments of the present invention relate to a mobile terminal, and more particularly, to a mobile terminal and a method of displaying an image in a mobile terminal. Although features disclosed herein are suitable for a wide scope of applications, they are particularly suitable for displaying a preview image including object relevant information.

DISCUSSION OF THE RELATED ART

Generally, terminals can be classified into mobile/portable terminals and stationary terminals. The mobile terminals can be classified into handheld terminals and vehicle mounted terminals according to the manner of portability.

As functions of the terminal become increasingly diversified, the terminal may be implemented as a multimedia player provided with composite functions such as capturing of photos or moving pictures, playback of music or moving picture files, game play, and broadcast reception.

To support this increase of the terminal functions, improvement of structural and/or software components of the terminal may be considered.

In the related art, according to an augmented reality program, a mobile terminal is able to display information (e.g., point-of-interest (POI) information) relevant to objects (or entities) belonging to (or located in) a corresponding area within a preview image input from a camera of the mobile terminal.

However, according to the related art, object relevant information is provided only for a preview image actually input by the camera. In order to obtain object relevant information for an area that is not part of the preview image, a mobile terminal must be moved to the corresponding area such that it can receive an input of a preview image of the corresponding area.

SUMMARY

Accordingly, embodiments of the present invention are directed to a mobile terminal and a method for displaying images in a mobile terminal. Particular embodiments are directed to substantially obviating limitations and disadvantages of the related art.

One aspect of the present invention is to provide a mobile terminal and an image displaying method in a mobile terminal. In particular, assuming a case that a terminal is virtually located at a specific area but not actually located at the specific area, embodiments of the present invention can provide a virtual image and location information corresponding to the virtual image.

Another aspect of the present invention is to provide a mobile terminal and an image displaying method in a mobile terminal, according to which a viewpoint indicator for viewing a location and direction within a real or virtual image can be displayed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

According to one embodiment, a mobile terminal includes a camera module for capturing an image; a position-location module for obtaining first information regarding a current location of the mobile terminal; a display unit for displaying the captured image and a viewpoint indicator on the captured image, the viewpoint indicator displayed at a point corresponding to the obtained first information and indicating a direction; a user input unit for receiving an input of a shift command signal for shifting the display of the viewpoint indicator; and a controller for controlling the display unit to shift the display of the viewpoint indicator to a point corresponding to the shift command signal and to display second information regarding at least one entity oriented about the mobile terminal along the indicated direction.

According to one embodiment, a method of displaying an image in a mobile terminal includes: receiving a captured image; obtaining first information regarding a current location of the mobile terminal; displaying the received image; displaying a viewpoint indicator on the received image at a point corresponding to the obtained first information, the viewpoint indicator indicating a direction; receiving an input of a shift command signal for shifting the display of the viewpoint indicator; shifting the display of the viewpoint indicator to a point corresponding to the input shift command signal; and displaying second information regarding at least one entity oriented about the mobile terminal along the indicated direction.

It is understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts. The suffixes 'module' and 'unit' for the elements used in the following description are given or used in common by considering facilitation in writing this disclosure only but fail to have meanings or roles discriminated from each other.

Mobile terminals described in this disclosure can include a mobile phone, a smart phone, a laptop computer, a digital broadcast terminal, a PDA (personal digital assistant), a PMP (portable multimedia player), and a navigation system.

Except where applicable to a mobile terminal only, it will be appreciated by those skilled in the art that features described herein with reference to one or more embodiments may be applicable to a stationary terminal such as a digital TV, or a desktop computer.

Figure 1:
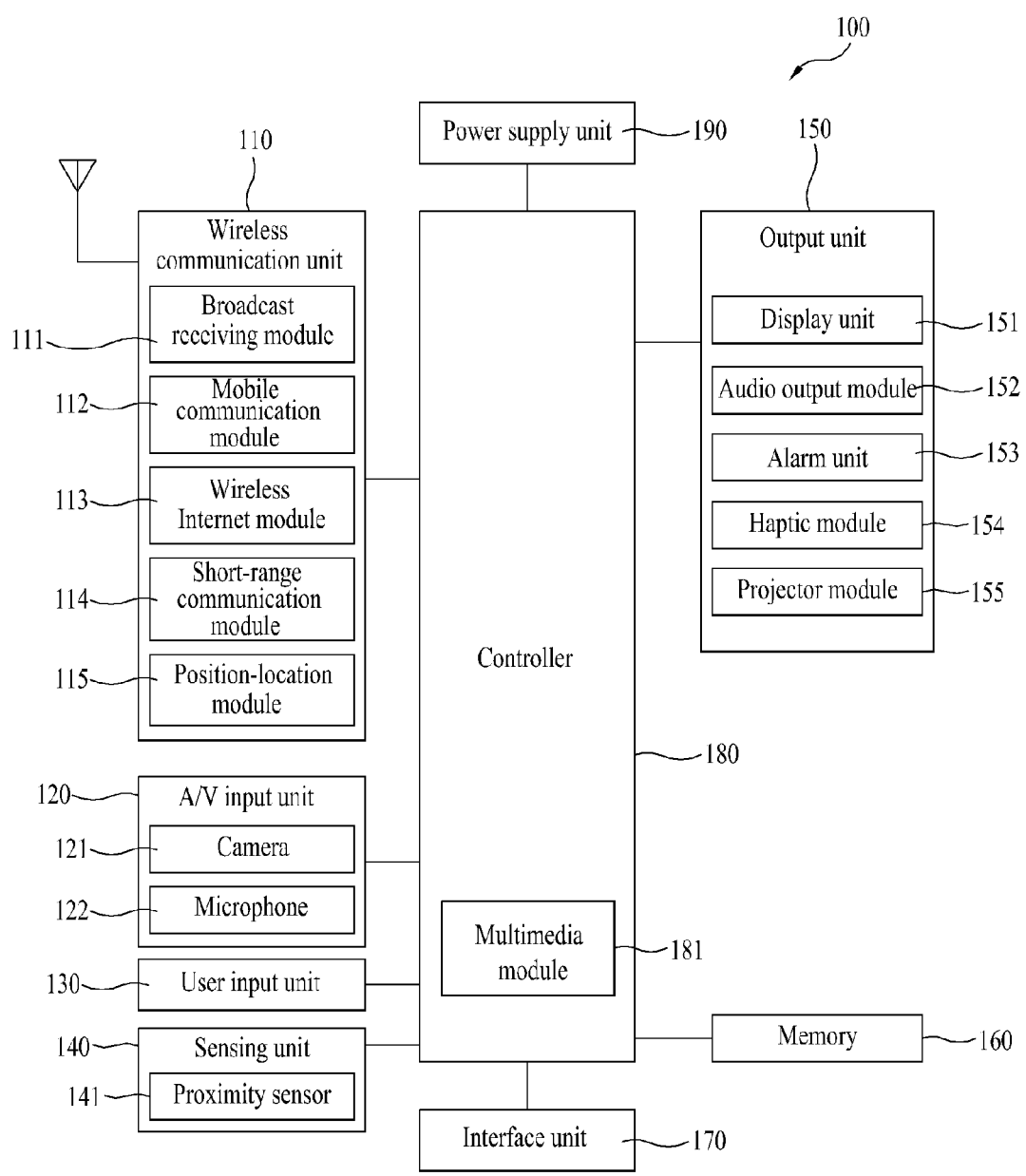
FIG. 1 is a block diagram of a mobile terminal according to one embodiment of the present invention.

FIG. 1 is a block diagram of a mobile terminal 100 according to one embodiment of the present invention. Referring to FIG. 1, the mobile terminal 100 includes a wireless communication unit 110, an A/V (audio/video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. More or fewer components may be implemented according to various embodiments.

The wireless communication unit 110 typically includes one or more components which permit wireless communication between the mobile terminal 100 and a wireless communication system or network within which the mobile terminal 100 is located. For instance, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server via a broadcast channel. The broadcast channel may include a satellite channel and/or a terrestrial channel.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal and/or broadcast associated information received by the broadcast receiving module 111 may be stored in a suitable device, such as a memory 160.

The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 111 may be configured to receive broadcast signals transmitted from various types of broadcast systems. By nonlimiting example, such broadcasting systems may include digital multimedia broadcasting-terrestrial (DMB-T), digital multimedia broadcasting-satellite (DMB-S), DVB-H, the data broadcasting system known as media forward link only (MediaFLO™) and integrated services digital broadcast-terrestrial (ISDB-T). Optionally, the broadcast receiving module 111 can be configured to be suitable for other broadcasting systems as well as the above-noted digital broadcasting systems.

The mobile communication module 112 transmits/receives wireless signals to/from one or more network entities (e.g., a base station, an external terminal, and/or a server). Such wireless signals may carry audio, video, and data according to text/multimedia messages.

The wireless Internet module 113 supports Internet access for the mobile terminal 100. This module may be internally or externally coupled to the mobile terminal 100. The wireless Internet technology can include WLAN (Wireless LAN), Wi-Fi, Wibro™ (Wireless broadband), Wimax™ (World Interoperability for Microwave Access), and HSDPA (High Speed Downlink Packet Access).

The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few.

The position-location module 115 identifies or otherwise obtains the location of the mobile terminal 100. According to one embodiment, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes (or produces) image frames of still pictures or video, which are obtained by an image sensor in a video call mode or a photographing mode. Furthermore, the processed image frames can be displayed on the display unit 151.

The image frames processed by the camera 121 can be stored in the memory 160 or can be transmitted to an external recipient via the wireless communication unit 110. Optionally, at least two cameras 121 can be provided in the mobile terminal 100 according to the environment of usage.

The microphone 122 receives an external audio signal while the portable device is in a particular mode, such as phone call mode, recording mode and voice recognition mode. This audio signal is processed and converted into electronic audio data. The processed audio data is transformed into a format transmittable to a mobile communication base station via the mobile communication module 112 in a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, and a jog switch.

The sensing unit 140 provides sensing signals for controlling operations of the mobile terminal 100 using status measurements of various aspects of the mobile terminal. For instance, the sensing unit 140 may detect an open/closed status of the mobile terminal 100, the relative positioning of components (e.g., a display and keypad) of the mobile terminal 100, a change of position (or location) of the mobile terminal 100 or a component of the mobile terminal 100, a presence or absence of user contact with the mobile terminal 100, and an orientation or acceleration/deceleration of the mobile terminal 100.

As an example, a mobile terminal 100 configured as a slide-type mobile terminal is considered. In this configuration, the sensing unit 140 may sense whether a sliding portion of the mobile terminal is open or closed. According to other examples, the sensing unit 140 senses the presence or absence of power provided by the power supply 190, and the presence or absence of a coupling or other connection between the interface unit 170 and an external device. According to one embodiment, the sensing unit 140 can include a proximity sensor 141.

The output unit 150 generates output relevant to the senses of sight, hearing, and touch. Furthermore, the output unit 150 includes the display unit 151, an audio output module 152, an alarm unit 153, a haptic module 154, and a projector module 155.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the displays can be implemented as a transparent or optical transmittive type, i.e., a transparent display. A representative example of the transparent display is the TOLED (transparent OLED). A rear configuration of the display unit 151 can be implemented as the optical transmittive type as well. In this configuration, a user may be able to see an object located at the rear of a terminal body on a portion of the display unit 151 of the terminal body.

At least two display units 151 can be provided in the mobile terminal 100 in accordance with one embodiment of the mobile terminal 100. For instance, a plurality of display units can be arranged to be spaced apart from each other or to form a single body on a single face of the mobile terminal 100. Alternatively, a plurality of display units can be arranged on different faces of the mobile terminal 100.

If the display unit 151 and a sensor for detecting a touch action (hereinafter called 'touch sensor') is configured as a mutual layer structure (hereinafter called 'touchscreen'), the display unit 151 is usable as an input device as well as an output device. In this case, the touch sensor can be configured as a touch film, a touch sheet, or a touchpad.

The touch sensor can be configured to convert pressure applied to a specific portion of the display unit 151 or a variation of capacitance generated from a specific portion of the display unit 151 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 180. Therefore, the controller 180 is made aware when a prescribed portion of the display unit 151 is touched.

Referring to FIG. 1, a proximity sensor 141 can be provided at an internal area of the mobile terminal 100 enclosed by the touchscreen or around the touchscreen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 141 is more durable than a contact type sensor and also has utility broader than the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touchscreen includes the electrostatic capacity proximity sensor, it is configured to detect the proximity of a pointer using a variation of an electric field according to the proximity of the pointer. In this configuration, the touchscreen (touch sensor) can be considered as the proximity sensor 141.

In the following description, for purposes of clarity, an action in which a pointer that approaches the touchscreen without contacting with the touchscreen is recognized is referred to as 'proximity touch'. Furthermore, an action in which a pointer actually touches the touchscreen is referred to as 'contact touch'. The position on the touchscreen that is proximity-touched by the pointer refers to the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touchscreen.

The audio output module 152 functions in various modes including a call-receiving mode, a call-placing mode, a recording mode, a voice recognition mode, and a broadcast reception mode to output audio data which is received from the wireless communication unit 110 or is stored in the memory 160. During operation, the audio output module 152 outputs audio relating to a particular function (e.g., call received, message received). The audio output module 152 may be implemented using one or more speakers, buzzers, other audio producing devices, and combinations thereof.

The alarm unit 153 outputs a signal for announcing the occurrence of a particular event associated with the mobile terminal 100. Typical events include a call received, a message received and a touch input received. The alarm unit 153 is able to output a signal for announcing the event occurrence by way of vibration as well as video or audio signal. The video or audio signal can be output via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. The strength and pattern of the vibration generated by the haptic module 154 are controllable. For instance, different vibrations can be output in a manner of being synthesized together or can be output in sequence.

The haptic module 154 is able to generate various tactile effects as well as the vibration. For instance, the haptic module 154 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 154 can be implemented to enable a user to sense the tactile effect through a muscle sense of a finger or an arm as well as to transfer the tactile effect through direct contact. Optionally, at least two haptic modules 154 can be provided in the mobile terminal 100 in accordance with one embodiment of the mobile terminal 100.

The projector module 155 is an element for performing an image projector function using the mobile terminal 100. The projector module 155 is able to display an image, which is identical to or at least partially different from the image displayed on the display unit 151, on an external screen or wall according to a control signal of the controller 180.

In particular, the projector module 155 can include a light source (not shown in the drawing) generating light (e.g., a laser) for projecting an external image, an image producing means (not shown in the drawing) for producing an external image to project using the light generated from the light source, and a lens (not shown in the drawing) for enlarging the external image according to a predetermined focal distance. Furthermore, the projector module 155 can further include a device (not shown in the drawing) for adjusting an image projection direction by mechanically moving the lens or the whole module.

The projector module 155 can be a CRT (cathode ray tube) module, an LCD (liquid crystal display) module, or a DLP (digital light processing) module according to a device type. In particular, the DLP module is operated by enabling the light generated from the light source to reflect on a DMD (digital micro-mirror device) chip and can be advantageous for reducing the size of the projector module 155.

Preferably, the projector module 155 can be provided in a lengthwise direction of a lateral, front or backside direction of the mobile terminal 100. Furthermore, it is understood that the projector module 155 can be provided in any portion of the mobile terminal 100 as deemed necessary.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures, and moving pictures. Furthermore, a recent use history or a cumulative use frequency of each data (e.g., use frequency for each phonebook, each message or each multimedia file) can be stored in the memory 160. Moreover, data for various patterns of vibration and/or sound output in response to a touch input to the touchscreen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, or XD memory), or other similar memory or data storage device. Furthermore, the mobile terminal 100 is able to operate in association with a web storage for performing a storage function of the memory 160 on the Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 100 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, and video calls. The controller 180 may include a multimedia module 181 that provides multimedia playback. The multimedia module 181 may be configured as part of the controller 180, or implemented as a separate component. Moreover, the controller 180 is able to perform a pattern recognizing process for recognizing a writing input and a picture drawing input carried out on the touchscreen as characters or images, respectively.

The power supply unit 190 provides power required by various components of the mobile terminal 100. The power may be internal power, external power, or combinations of internal and external power.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
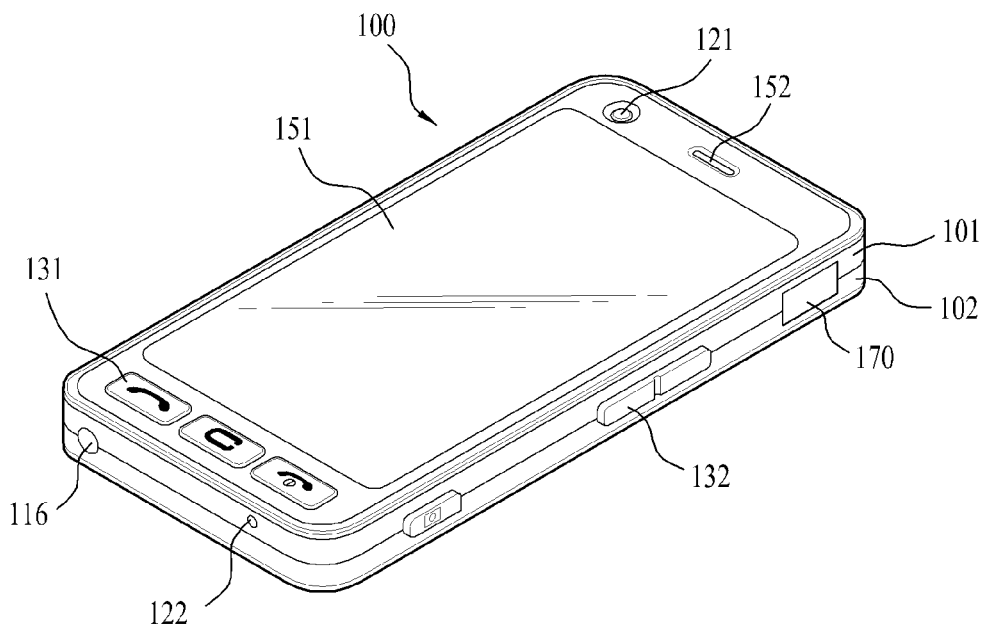
FIG. 2A is a front perspective view of a mobile terminal according to one embodiment of the present invention.

FIG. 2A is a front perspective view of a mobile terminal according to one embodiment of the present invention. The mobile terminal 100 illustrated in FIG. 2A has a bar type terminal body. However, the mobile terminal 100 may be implemented in a variety of different configurations.

Examples of such configurations include folder-type, slide-type, rotational-type, swing-type and combinations thereof. For ease of description, the following disclosure will primarily relate to a bar-type mobile terminal 100. However, it is understood that such disclosure may apply equally to other types of mobile terminals.

Referring to FIG. 2A, the mobile terminal 100 includes a case (a casing, housing, or cover) constituting an exterior of the mobile terminal. In the present embodiment, the case can be divided into a front case 101 and a rear case 102. Various electric/electronic parts are loaded in a space (volume) provided between the front and rear cases 101 and 102.

Optionally, at least one middle case can be further provided between the front and rear cases 101 and 102. The cases 101 and 102 are formed by injection molding of synthetic resin or can be formed of a metallic substance such as stainless steel (STS) or titanium (Ti) for example.

A display unit 151, an audio output unit 152, a camera 121, manipulating units 131 and 132, a microphone 122, and an interface unit 170 can be provided at the terminal body, and more particularly, at the front case 101. Manipulating units 131 and 132 are part of the user input unit 130 (see FIG. 1).

The display unit 151 occupies most of a main face of the front case 101. The audio output unit 152 and the camera 121 are provided at an area adjacent to an end portion of the display unit 151, while the manipulating unit 131 and the microphone 122 are provided at an area adjacent to the other end portion of the display unit 151. The manipulating unit 132 and the interface unit 170 can be provided at lateral sides of the front and rear cases 101 and 102.

The user input unit 130 may be manipulated (operated) to receive a command for controlling an operation of the terminal 100. Furthermore, the user input unit 130 may include a plurality of manipulating units 131 and 132. The manipulating units 131 and 132 can be referred to as a manipulating portion and may adopt any tactile mechanism that enables a user to perform a manipulation action by touch.

Content input by the first or second manipulating unit 131 or 132 can be divided between the two. For instance, a command such as start, end, and scroll is input to the first manipulating unit 131. Furthermore, a command for a volume adjustment of sound output from the audio output unit 152, or a command for a switching to a touch recognizing mode of the display unit 151 can be input to the second manipulating unit 132.

Figure 2B:
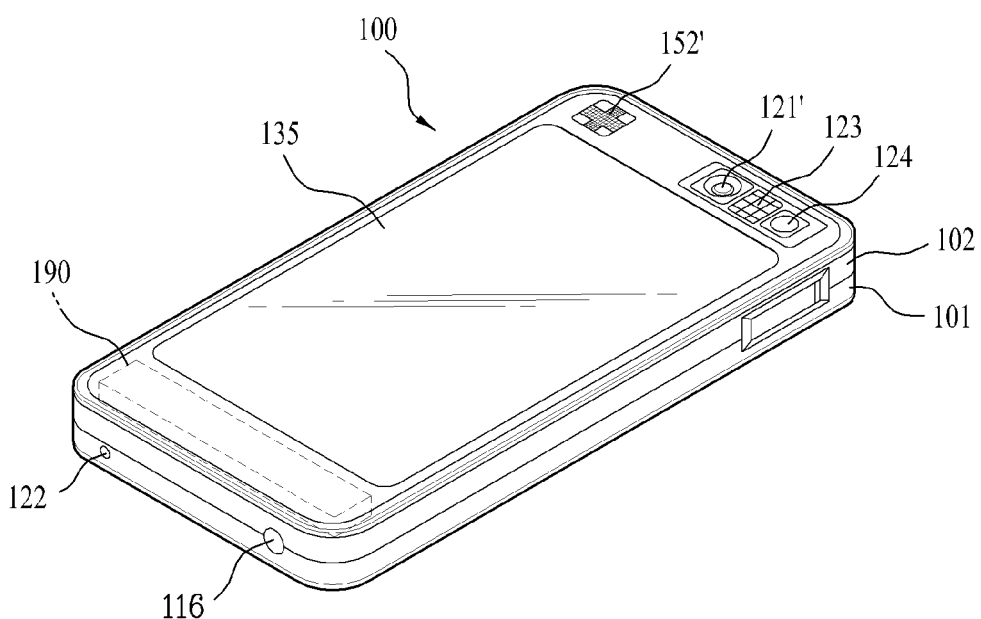
FIG. 2B is a rear perspective view of a mobile terminal according to one embodiment of the present invention.

FIG. 2B is a rear perspective view of the terminal of FIG. 2A. Referring to FIG. 2B, a camera 121' can be additionally provided at a rear of the terminal body, and more particularly, at the rear case 102. The camera 121' captures images along a direction that is substantially opposite to that of the camera 121 shown in FIG. 2A and may have a pixel resolution different from those of the camera 121.

According to one embodiment, for instance, the camera 121 has a relatively low number of pixels sufficient to capture and transmit a picture of a user's face for a video call, while the camera 121' has a relatively high number of pixels for capturing a photograph of a general subject. Furthermore, each of the cameras 121 and 121' can be installed on the terminal body to be rotated or popped up.

A flash 123 and a mirror 124 are additionally provided adjacent to the camera 121'. The flash 123 projects light toward a subject for photographing the subject using the camera 121'. When a user attempts to take a picture of the user (self-photography) using the camera 121', the mirror 124 enables the user to view the user's face as reflected by the mirror 124.

An additional audio output unit 152' can be provided at the rear of the terminal body. The additional audio output unit 152' is for implementing a stereo function together with the audio output unit 152 shown in FIG. 2A and may be used for implementation of a speakerphone mode when speaking over the terminal.

A broadcast signal receiving antenna 116 can be additionally provided at the lateral side of the terminal body as well as an antenna for communication. The antenna may constitute a portion of the broadcast receiving module 111 shown in FIG. 1 and be retractable into the terminal body.

A power supply unit 190 for supplying a power to the terminal 100 is provided at the terminal body. Furthermore, the power supply unit 190 can be configured to be built within the terminal body. Alternatively, the power supply unit 190 can be configured to be detachably connected to the terminal body.

A touchpad 135 for detecting a touch can be additionally provided at the rear case 102. The touchpad 135 can be configured as a light transmittive type similar to the display unit 151. In this case, if the display unit 151 is configured to output visual information from both of its faces, the visual information is viewable via the touchpad 135 as well. The information output from both of the faces can be entirely controlled by the touchpad 135. Alternatively, a display is further provided for the touchpad 135 so that a touchscreen can be provided at the rear case 102 as well.

The touchpad 135 is activated by interconnecting with the display unit 151 of the front case 101. The touchpad 135 can be provided at the rear of the display unit 151 to extend parallel to the display unit 151. The touchpad 135 can have a size equal to or smaller than the size of the display unit 151.

Figure 3:
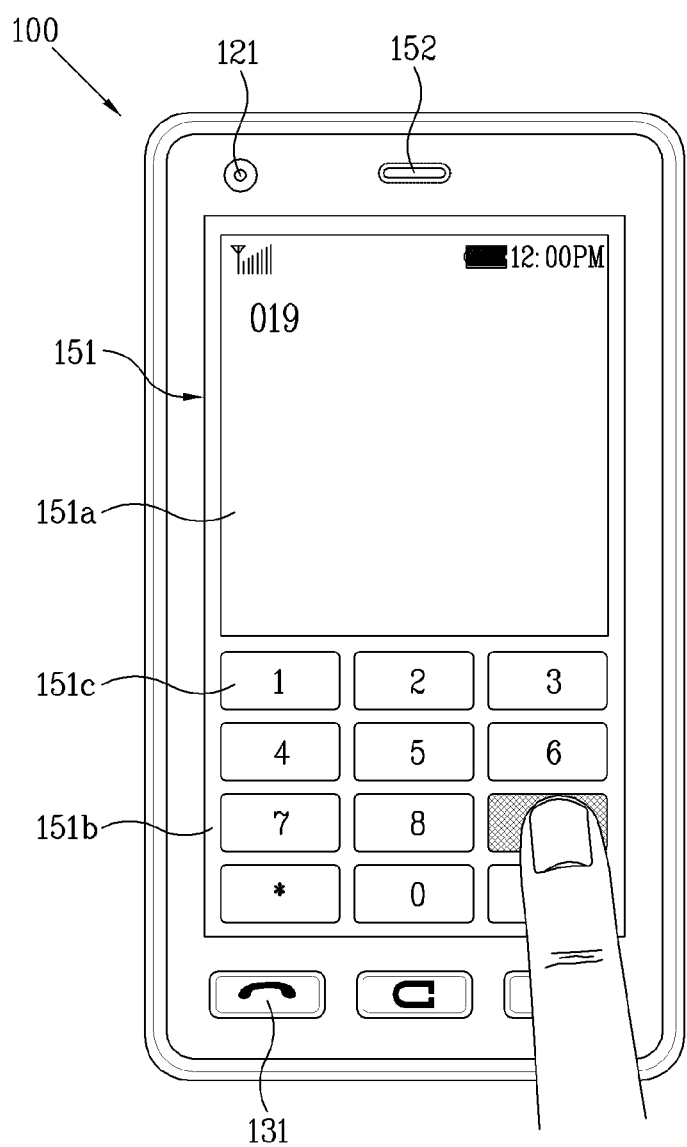
FIG. 3 is a front view of a mobile terminal according to one embodiment of the present invention illustrating an operational status of the mobile terminal.

An interconnected operational mechanism between the display unit 151 and the touchpad 135 is described with reference to FIG. 3. FIG. 3 is a front view of a terminal operating in one operation state according to one embodiment of the present invention.

Various kinds of visual information can be displayed on the display unit 151. Furthermore, this information can be displayed using characters, numerals, symbols, graphics, and icons.

In order to input information, at least one of the characters, numerals, symbols, graphics and icons is represented as (part of) a single predetermined array to be implemented in a keypad formation. Furthermore, this keypad formation can be implemented as so-called 'soft keys'. FIG. 3 shows that a touch applied to a soft key is input through a front face of a terminal body.

The display unit 151 is operable via an entire area or divided into regions. In the latter case, a plurality of the regions can be configured to be interoperable.

For instance, with reference to FIG. 3, an output window 151a and an input window 151b are displayed on the display unit 151. A soft key 151c representing a digit for inputting a phone number is output to (or displayed on) the input window 151b. That is, if the soft key 151c is touched, a digit corresponding to the touched soft key is output to the output window 151a. If the first manipulating unit 131 is manipulated (or operated), a call connection for the phone number displayed on the output window 151a is attempted.

Mobile terminals described herein with reference to various embodiments can include at least one of the components shown in FIG. 1. Moreover, a mobile terminal can include a touchscreen for receiving an input of a touch action from a user and displaying prescribed information simultaneously.

Object relevant information (or information regarding a particular entity), as described in this disclosure, may include information relevant to at least one object (or entity) oriented about the mobile terminal along a direction indicated by a viewpoint indicator, which shall be described later in this disclosure. The object relevant information may include an image including the at least one object and location information (or information of a location) regarding each of the at least one object. In this case, the image can include an image actually captured via a camera or a virtual image if the terminal is considered to be at a virtual location.

Figure 4:
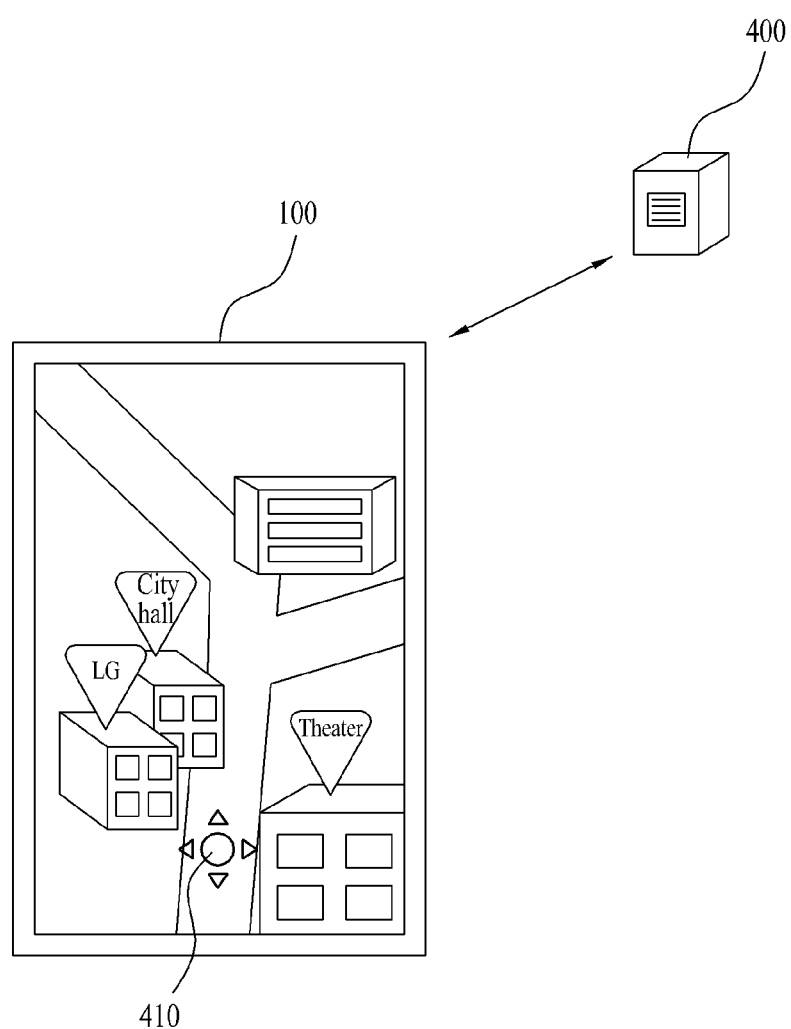
FIG. 4 is a block diagram of a mobile terminal displaying a preview image including location information according to one embodiment of the present invention and an external server.
Figure 5:
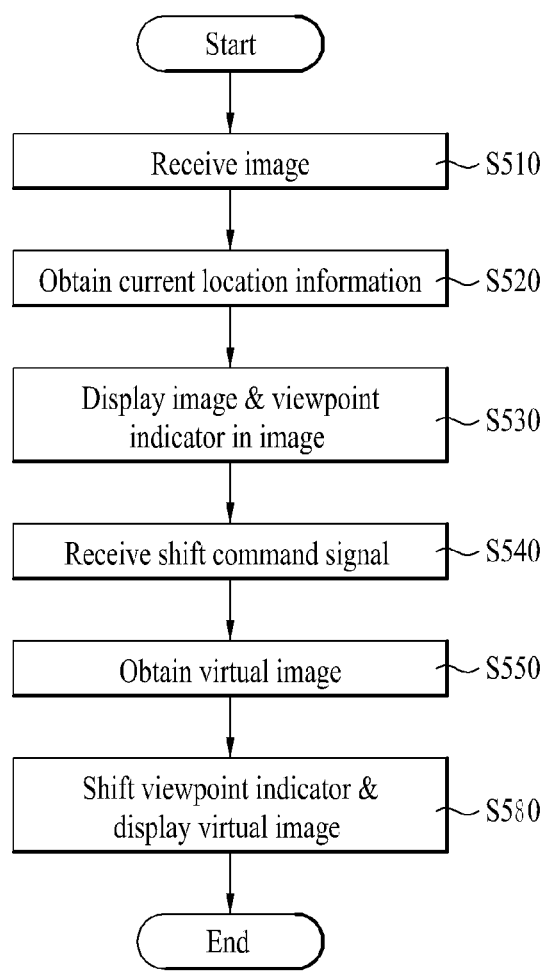
FIG. 5 is a flowchart for a method of displaying an image in a mobile terminal according to one embodiment of the present invention.

In the following description, a method of displaying an image in a mobile terminal according to embodiments of the present invention is described in more detail with reference to the accompanying drawings. FIG. 4 is a block diagram of a display of a mobile terminal 100 displaying a preview image including location information and an external server 400 transceiving information with the mobile terminal 100. The external server 400 transmits information to and receives information from the mobile terminal 100. FIG. 5 is a flowchart illustrating displaying an image in the mobile terminal 100 according to one embodiment of the present invention.

Referring to FIG. 5, the mobile terminal 100 receives an input of an image captured via the camera 121 [S510]. When the mobile terminal 100 enters a camera photographing mode (or state) or an augmented reality drive mode (or state), the camera 121 is activated and is then able to receive an image captured using the activated camera 121.

The camera photographing mode or the augmented reality drive mode can be entered if a corresponding menu item or a corresponding key (or a key zone) is selected. Moreover, while a preview image captured by the camera 121 while the mobile terminal 100 is in the camera photographing mode is being displayed, the mobile terminal 100 is able to also enter the augmented reality drive mode.

The augmented reality drive mode pertains to a field of virtual reality and can be described as a computer graphic scheme that synthesizes a virtual object with a real environment to display the object to appear as if the object exists in the real environment. Therefore, in the augmented reality drive mode, the mobile terminal 100 is able to display a virtual object or image in a manner such that the virtual object or image is synthesized over an image representing a real environment that is input via the camera 121. According to one embodiment of the present invention, the virtual object or image can include location information or a viewpoint indicator.

In particular, the image input by the camera 121 can include a preview image or a moving picture (i.e., a video) captured via the camera 121. More particularly, the input image can be zoomed in/out according to a user setting.

The mobile terminal 100 obtains current location information (information regarding a current location) of the mobile terminal 100 using the position-location module 115 [S520]. In particular, the mobile terminal 100 is able to obtain its location information from a satellite using a GPS (global positioning system). For instance, the current location information can include a longitude, a latitude, and/or coordinates of a point at which the mobile terminal 100 is currently located.

The current location information of the mobile terminal can further include a direction (e.g., a geographical direction) faced by the camera 121 of the mobile terminal 100 when the mobile terminal 100 is at a given location (e.g., its current location). The mobile terminal 100 includes a motion detection sensor (not shown in the drawing) and is able to sense a direction faced by the camera 121 using the motion detection sensor. For instance, the direction faced by the camera 121 can be represented as east, west, south or north.

Moreover, under the control of the controller 180, the mobile terminal 100 is able to obtain location information of at least one object (or entity) located within a predetermined distance from the mobile terminal 100 with reference to the obtained current location information of the mobile terminal. Furthermore, under the control of the controller 180, the mobile terminal is able to display the obtained location information of the at least one or more objects within the image captured by the camera 121.

If an object image corresponding to the displayed location information exists, the location information is displayed as being interconnected to the corresponding object image. If an object image corresponding to the displayed location information does not exist, the location information is displayed at a predicted point where the corresponding object may exist. For instance, if the location information indicates ' electronics' and the corresponding object is a building, the location information ' electronics' can be displayed within the displayed image as being interconnected to the image of the ** electronics building.

The object can include an entity whose address information (or location information) is within a predetermined distance from the mobile terminal 100 such as a building, a market, and a shopping street. The object image can include an image corresponding to the object that is within the predetermined distance.

The location information of the object may include identity information of the object and can include at least one of a name of the object (e.g., POI (point of interest)), and a representative icon of the object. According to one embodiment, location information exists for only some or all objects located within a predetermined distance from the mobile terminal 100.

In the following description, a procedure for obtaining the location information is described in more detail. The controller 180 is able to recognize a point (or location), at which the mobile terminal 100 is currently located, using the coordinates information in the obtained current location information. The controller 180 is also able to recognize an orientation of the mobile terminal 100 at the currently located point using the direction faced by the camera 121 in the obtained current location information. Therefore, the controller 180 is able to obtain location information of each of the at least one object located within a predetermined distance in front of the mobile terminal 100.

In the following description, a location information obtaining procedure according to a first embodiment is described. The mobile terminal 100 enables location information for each object to be stored in the memory 160. Under the control of the controller 180, the mobile terminal 100 is then able to search for location information of the at least one object from the object location information that was previously stored in the memory. Coordinates information of the object having the corresponding location information can be stored in the memory 160 together with the corresponding location information.

In particular, the controller 180 is able to search the memory 160 for at least one object having coordinates information corresponding to a predetermined geographical range (e.g., a predetermined distance) in front of the mobile terminal 100 and for the location information corresponding to each of the at least one object. Therefore, if the location information stored in the memory 160 is searched, the controller 180 is able to obtain location information of the at least one object within the predetermined distance in front of the mobile terminal 100.

The location information and the coordinates information previously stored in the memory 160 may be received from an external server or may be stored by default in the course of manufacturing the terminal. Also, the object location information and the coordinates information previously stored in the memory 160 may be updated periodically or at a random point in time.

In the following description, a location information obtaining procedure according to a second embodiment is described. The mobile terminal 100 is able to receive the location information of at least one object located within a predetermined distance in front of the mobile terminal 100 from an external server via the wireless communication unit 110.

In particular, the mobile terminal 100 transmits a signal for requesting the location information of at least one object located within a predetermined distance in front of the mobile terminal 100 to an external server. The mobile terminal 100 is then able to receive the location information of the at least one object located within a predetermined distance in front of the mobile terminal 100.

According to one embodiment, the request signal includes coordinates information of the at least one object or a predetermined distance for displaying the coordinates information and location information of the mobile terminal 100. In the former case, the mobile terminal 100 receives the location information corresponding to the coordinates information included in the request signal from the external server. In the latter case, the mobile terminal 100 receives the location information of the at least one object located within the predetermined distance in front of the mobile terminal 100 at its current location from the external server.

Referring to FIG. 5, under the control of the controller 180, the mobile terminal 100 displays the received image and also displays a viewpoint indicator at the point corresponding to the obtained current location information in the input image [S530]. The displaying operation [S530] may be performed by the display unit 151 or a touchscreen (not shown in the drawing).

The mobile terminal 100 is able to display the location information of the at least one object, which is located within a predetermined distance from the mobile terminal 100, at a corresponding point within the input image. The corresponding point may include a point of the image at which the corresponding object is displayed or a point at which it is predicted that the corresponding object image would be displayed within the input image. The obtaining and the displaying of the location information were described previously with reference to earlier embodiments.

The viewpoint indicator may include a means for indicating a point at which the mobile terminal 100 is currently located, and a direction faced by the mobile terminal 100 within the input image. In particular, the point at which the mobile terminal 100 is currently located, and the direction faced by the mobile terminal 100 can be obtained from the obtained current location information of the mobile terminal 100. For instance, the viewpoint indicator may include an indicated direction (i.e., this direction matches the direction currently faced by the mobile terminal 100), a direction setter (i.e., a means for changing a direction indicated by the viewpoint indicator), and a peripheral radius for displaying the point information.

In the displaying operation [S530], as the augmented reality drive mode is executed, an image generated from combining the input image, i.e., a real image, with the viewpoint indicator, i.e., a virtual image, is displayed. The mobile terminal 100 then receives a shift command signal of the displayed viewpoint indicator via the user input unit 130 [S540]. The user input unit 130 can include a means for receiving or detecting a user action to input the shift command signal of the viewpoint indicator.

For instance, if a "touch & drag" action to a specific-shift point from the viewpoint indicator is received or if a touch action to a specific-shift point and a touch action to the viewpoint indicator are received, the shift command signal of the viewpoint indicator may be input. The specific-shift point, to which the viewpoint indicator shall be shifted, can include one of a random point within a currently displayed image, a specific object image included in an image, and information on a specific location included in an image. If an inclining motion of the mobile terminal 100 is detected via the motion detection sensor, the shift command signal of the viewpoint indicator may be input according to an incline degree or direction caused by the detected inclining motion.

The mobile terminal then obtains a virtual image [S550]. In the following description, a procedure for obtaining object relevant information of at least one object existing (located) in a direction indicated by the viewpoint indicator that is shifted to the point corresponding to the input shift command signal is described in more detail. For clarity and convenience of description, it is assumed that the object relevant information pertains to a virtual image.

According to one embodiment, the mobile terminal 100 is able to receive a virtual image from the external server 400. Under the control of the controller 180, the mobile terminal 100 transmits a request signal to the external server for a virtual image corresponding to a direction indicated by the viewpoint indicator at a point corresponding to the input shift command signal.

The point corresponding to the input shift command signal can mean the point to which the viewpoint indicator is shifted. If there is a direction separately set using a direction setter of the viewpoint indicator, the direction, which is indicated by the viewpoint indicator, is the separately set direction. If a direction is not separately set, the direction indicated by the viewpoint indicator can be the currently indicated direction.

The virtual image request signal can include location information of the point corresponding to the input shift command signal and the direction which is indicated by the viewpoint indicator. In addition, the virtual image request signal can include size information of the requested virtual image.

Under the control of the controller 180, the mobile terminal 100 receives a virtual image from the external server 400 as a result of the transmission of the request signal for the corresponding virtual image.

In particular, the mobile terminal 100 is able to receive a virtual image from the external server 400 corresponding to a direction indicated by the viewpoint indicator at the point (e.g., obtained from the location information of the point corresponding to the shift command signal) to which the viewpoint indicator is shifted. If size information of the virtual image is included in the virtual image request signal, the mobile terminal 100 is able to receive the virtual image sized according to the included size information. Furthermore, the mobile terminal 100 is able to receive location information regarding at least one object located in an area of the virtual image as well as the corresponding virtual image.

According to a second embodiment, the mobile terminal 100 is able to search the memory 160 for a virtual image. The mobile terminal 100 includes the memory 160 for storing a plurality of virtual images. The mobile terminal 100 searches a plurality of the virtual images stored in the memory 160 for a virtual image corresponding to a direction indicated by the viewpoint indicator at the point corresponding to the input shift command signal under the control of the controller 180.

If the corresponding virtual image is an image input by the camera 121, virtual location information of the mobile terminal 100 and a predicted direction, which may be faced by the mobile terminal 100 at a point corresponding to the virtual location information, can be set and stored in the memory 160 together with a plurality of virtual images stored in the memory 160. Therefore, the controller 180 searches a plurality of the virtual images stored in the memory 160 for at least one virtual image, according to the virtual location information corresponding to the point corresponding to the input shift command signal. The controller 180 is then able to search the searched at least one or more virtual images for a virtual image for which a predicted direction equal to the direction to be indicated by the viewpoint indicator is set.

The mobile terminal 100 is able to receive location information regarding at least one object belonging to (located in) an area corresponding to the searched virtual image from the external server 400. Under the control of the controller 180, the mobile terminal 100 shifts the viewpoint indicator to the point corresponding to the input shift command signal and then displays the object relevant information of the at least one object existing in the direction indicated by the shifted viewpoint indicator [S580].

As mentioned in the foregoing description, the object relevant information of the at least one object existing in the direction indicated by the shifted viewpoint indicator can include the virtual image including each of the at least one or more objects and the location information of each of the at least one or more objects. The viewpoint indicator, which is the virtual image, can be displayed [S580] by being combined with another virtual image instead of the input image that is the real image.

In the following description, displaying the object relevant information [S580] is explained in detail. Shifting of the viewpoint indicator will be described with reference to FIGS. 6A to 6E. FIGS. 6A to 6E are diagrams illustrating screen configurations in which a viewpoint indicator is shifted according to embodiments of the present invention.

Figure 6A:
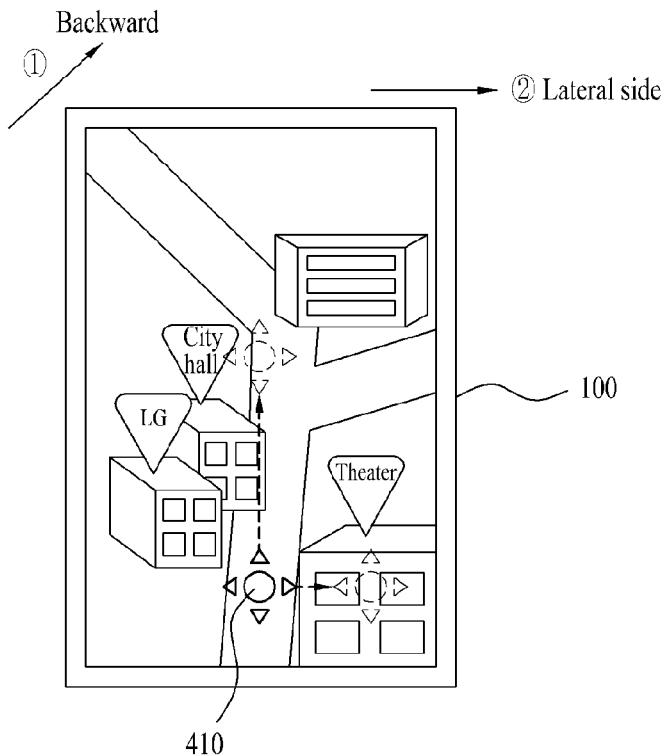
FIGS. 6A, 6B, 6C, 6D and 6E are views of screen configurations illustrating a shifting of a viewpoint indicator according to one embodiment of the present invention.

Referring to FIG. 6A, if the mobile terminal is inclined backward, the mobile terminal 100 shifts a viewpoint indicator 410 forward (or upwards) in proportion to an inclining angle (see angle corresponding to the numeral "1" enclosed by a circle). If the mobile terminal is inclined to the right, the mobile terminal 100 shifts a viewpoint indicator 410 to the right side in proportion to an inclining angle (see angle corresponding to the numeral "2" enclosed by a circle).

If the mobile terminal is inclined upward, the mobile terminal 100 shifts a viewpoint indicator 410 downward in proportion to an inclining angle [not shown in the drawing]. If the mobile terminal is inclined to the left, the mobile terminal 100 shifts a viewpoint indicator 410 to the left side in proportion to an inclining angle [not shown in the drawing].

Figure 6B:
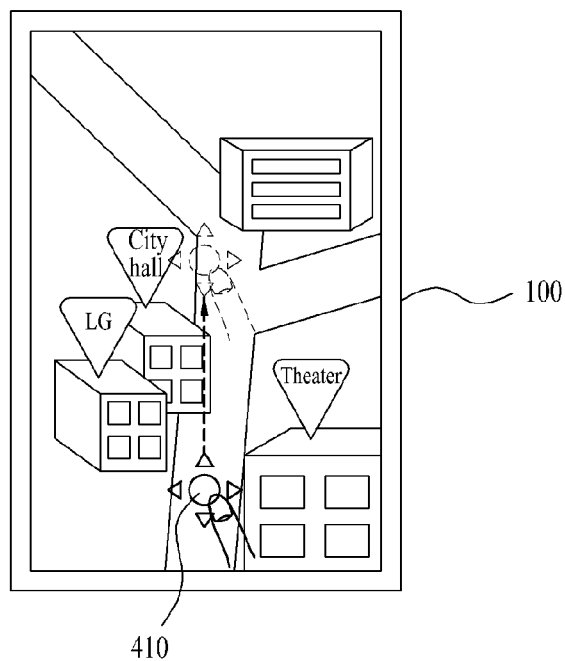

Referring to FIG. 6B, in response to receiving an input of a touch & drag action performed in a direction from a viewpoint indicator 410 to a specific point on a screen, the mobile terminal 100 shifts the viewpoint indicator 410 to the specific point. As the screen is scrolled, the mobile terminal 100 shifts the viewpoint indicator 410 accordingly by a corresponding amount [not shown in the drawing]. For instance, when the screen is scrolled downward, the viewpoint indicator 410 can be shifted upward accordingly by a corresponding amount.

Figure 6C:
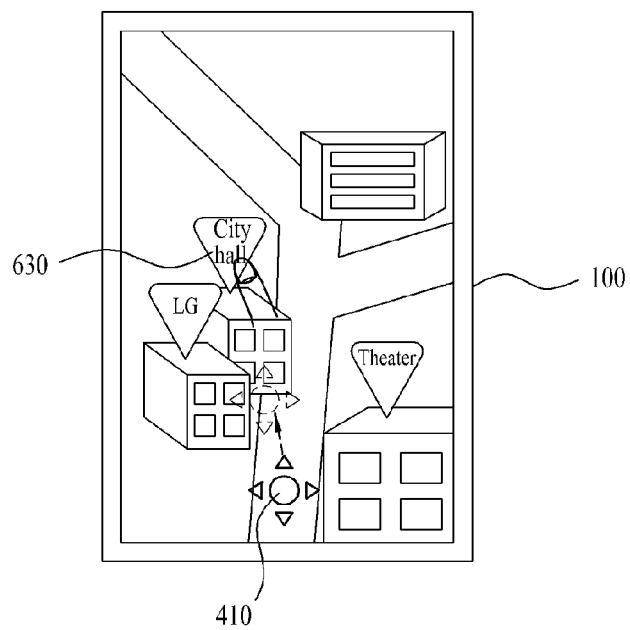
Figure 6D:
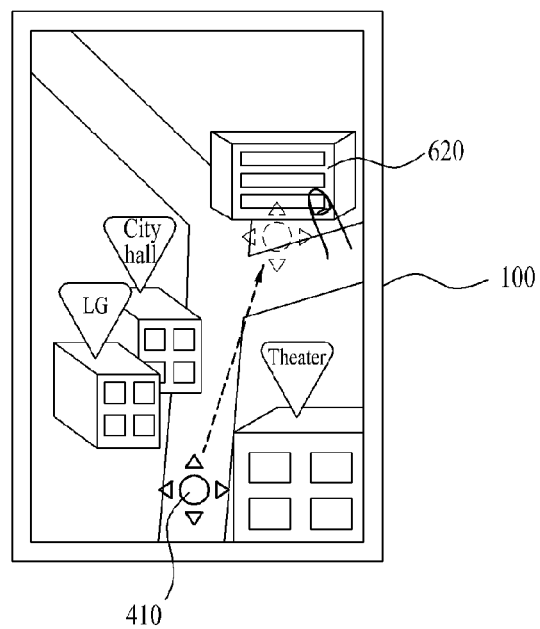

Referring to FIG. 6C, in response to receiving a user touch action performed on specific location information on a specific location included in an image such as City Hall 630, the mobile terminal 100 shifts a viewpoint indicator 410 to an object image (i.e., city hall building image) corresponding to City Hall 630. Referring to FIG. 6D, in response to receiving a user touch action performed on a specific object image such as a fire station building image 620, the mobile terminal 100 shifts a viewpoint indicator 410 to the specific object image (i.e., fire station building image 620).

If the mobile terminal does not display location information regarding the specific object image (i.e., fire station building image 620), a touch action pattern for commanding a display of the location information on the specific object image (i.e., fire station building image 620) may be different from a touch action pattern for commanding a shift of the viewpoint indicator 410 to the specific object image (i.e., fire station building image 620). For instance, the former touch action pattern may be a 1-time touch, or a touch having a first duration and a single touch, while the latter touch action pattern may be a 2-time touch, or a touch having a second duration and a multi-touch.

Figure 6E:
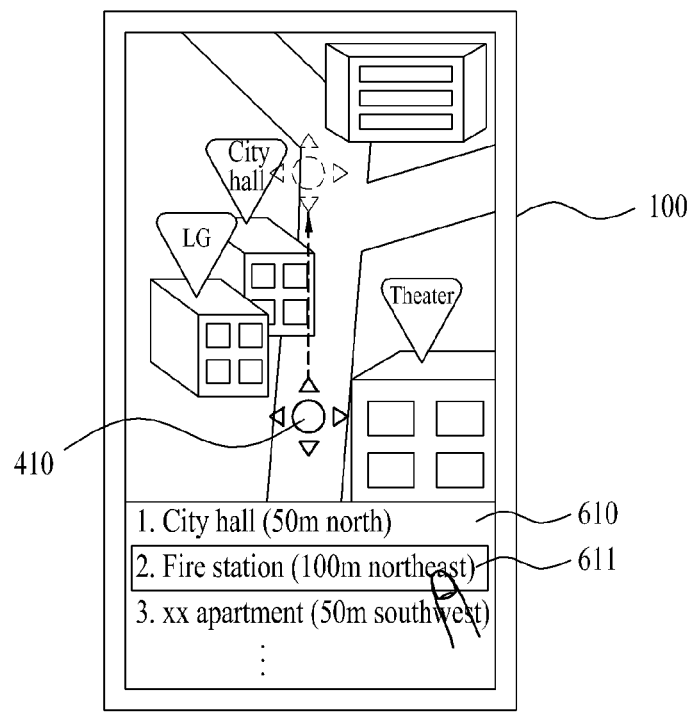

Referring to FIG. 6E, the mobile terminal 100 displays an image including location information on a first region of a screen and also displays a list 610 listing location information corresponding to objects not displayed in the image on a second region of the screen. For instance, location information corresponding to objects located within a radius of 50 meters from a viewpoint indicator are displayed within an image, and location information corresponding to objects located within a radius range between 50 meters and 200 meters from the viewpoint indicator 410 may be displayed within the location information list 610. If a specific piece of location information (e.g., location information corresponding to a fire station 611) is selected from the location information list 610 by a user, the mobile terminal 100 shifts the viewpoint indicator 410 to an object image (i.e., a fire station building image) corresponding to the specific location information (i.e., the fire station 611).

A virtual image viewed with reference to a shifted viewpoint indicator is described with reference to FIGS. 7A to 7D. FIGS. 7A to 7D are diagrams of screen configurations in which a virtual image is viewed with reference to a viewpoint indicator according to embodiments of the present invention.

Figure 7A:
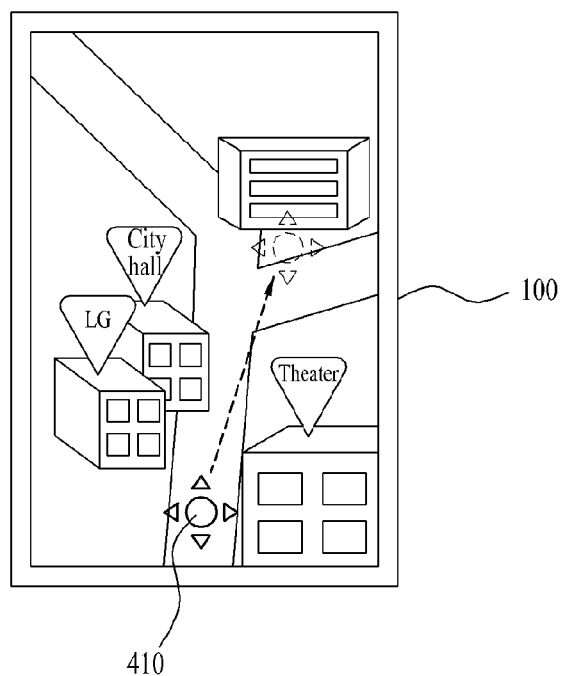
FIGS. 7A, 7B, 7C and 7D are views of screen configurations displaying a virtual image with reference to a viewpoint indicator according to one embodiment of the present invention.

Referring to FIG. 7A, the mobile terminal 100 shifts a viewpoint indicator 410 from a point (hereinafter referred to as a current point) corresponding to a current location of the mobile terminal 100 to a point (hereinafter referred to as a virtual point) at which a virtual image shall be displayed. As if the mobile terminal 100 is located at the virtual point to which the viewpoint indicator 410 has been shifted, the mobile terminal 100 displays the virtual image, which is expected to be input via the camera 121 at the virtual point, on the screen (see FIGS. 7B to 7D). In particular, the virtual image is not an image actually input via the camera 121 at the virtual point, but is an image expected to be input via the camera 121 at the virtual point.

Figure 7B:
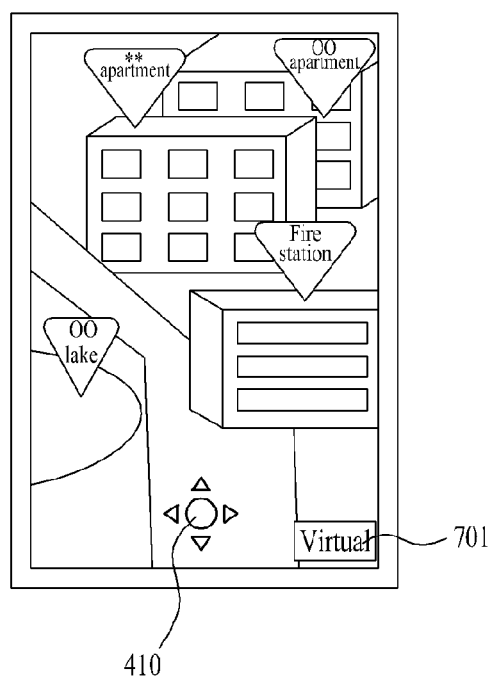

Referring to FIG. 7B, the mobile terminal 100 positions a viewpoint indicator 410 at a virtual point and then displays a virtual image viewed from the virtual point on the screen. In doing so, location information corresponding to an object displayed in the virtual image can be displayed as well.

Figure 7C:
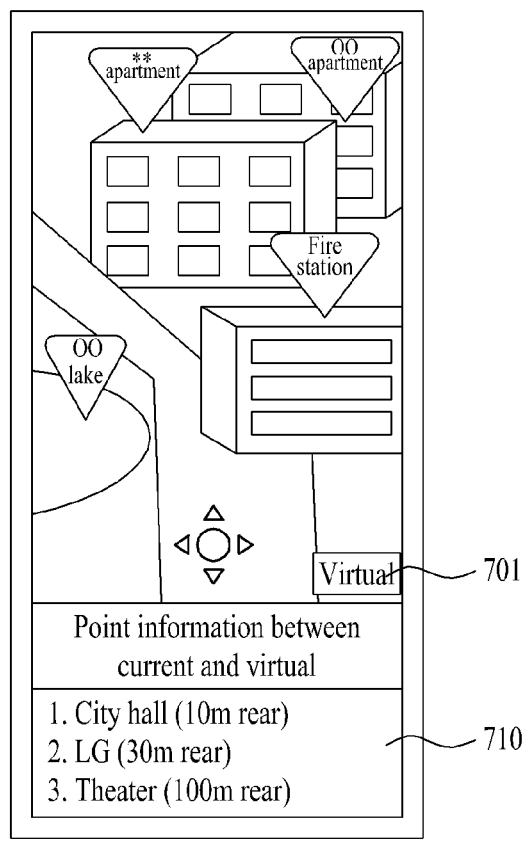

Referring to FIG. 7C, the mobile terminal 100 displays a virtual image, in which a viewpoint indicator 410 is located at a virtual point, on a first region of the screen and also displays a list 710 listing location information corresponding to objects located in a range between a current point and the virtual point on a second region of the screen. If the viewpoint indicator 410 is shifted to a second virtual point from a first virtual point, a list of location information corresponding to objects located in a range between the first virtual point and the second virtual point can be displayed.

Figure 7D:
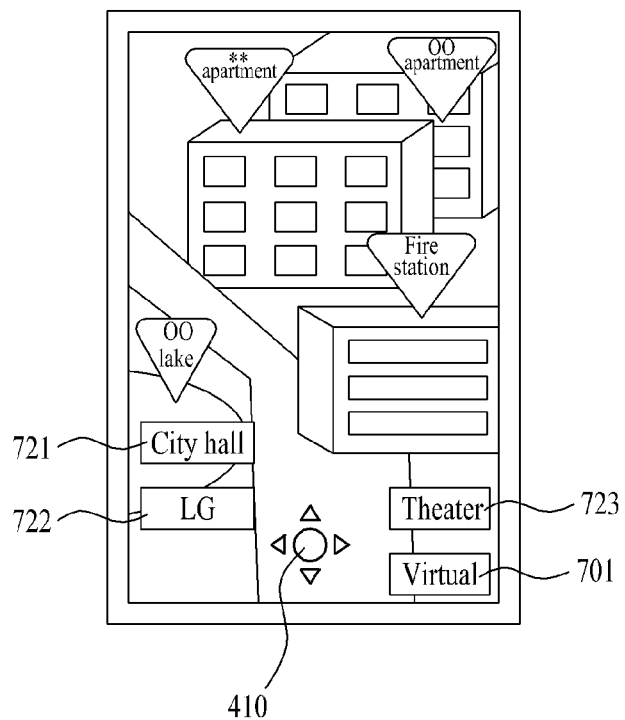

Referring to FIG. 7D, the mobile terminal 100 displays location information 721, 722, 723 corresponding to objects located in a range between a current point and a virtual point, while displaying a virtual image in which a viewpoint indicator 410 is located at the virtual point. For instance, location information 721 and 722, which is arranged on a left part of the screen among the noted location information, are arranged on a lower left part of the virtual image, while the location information 723, which was arranged on a right part of the screen, is arranged on a lower right part of the virtual image.

Referring to FIGS. 7B to 7D, a virtual icon 701 indicating that a virtual image is currently displayed is displayed on a prescribed region of the screen. Moreover, a key zone for receiving an input of a command for returning to a real image display can be provided on the screen [not shown in the drawings].

Although the drawing show a situation where the viewpoint indicator 410 is shifted to a virtual point from a current point, one of the above-described embodiments can be applied to a situation where the viewpoint indicator is shifted to a second virtual point from a first virtual point. In addition, in response to receiving an input of a shift command signal for shifting a viewpoint indicator to a virtual point, the mobile terminal 100 is able to display location information (hereinafter referred to as virtual location information) of at least one object located at the virtual point and in a direction indicated by the view point indicator instead of displaying a virtual image [not shown in the drawings]. In doing so, a real input image is displayed on one region of the screen, while the virtual location information is displayed on another region of the screen or on a whole screen.

Figure 8A:
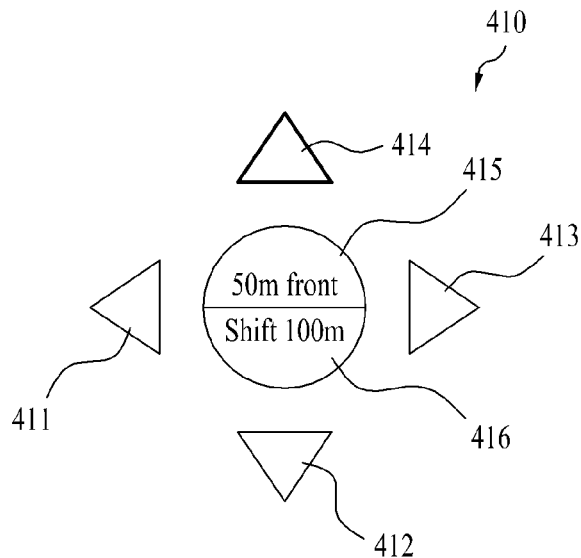
FIG. 8A and FIG. 8B are views of information provided using a viewpoint indicator according to an embodiment of the present invention.
Figure 8B:
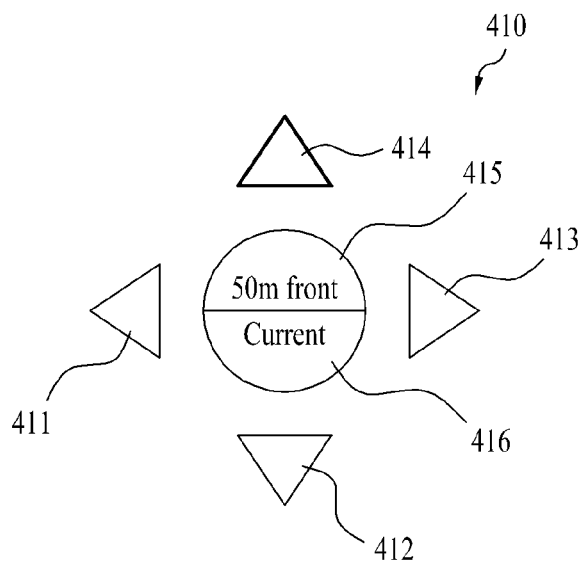

Information provided using a viewpoint indicator is explained with reference to FIG. 8A and FIG. 8B. FIG. 8A and FIG. 8B are diagrams of information provided using a viewpoint indicator according to embodiments of the present invention.

Referring to FIG. 8A, if a viewpoint indicator 410 is located at a virtual point, the viewpoint indicator 410 can indicate direction setters 411 to 414, a first zone 415 indicating a radius (e.g., 50 m in front) of a currently displayed virtual image, and a second zone 416 indicating a shifted distance (e.g., 100 m shifted) of the viewpoint indicator 410 from a current point to the virtual point. In particular, the direction setter 414 corresponding to a direction indicated by the viewpoint indicator 410 at a currently shifted point among the direction setters 411 to 414 can be selected and displayed.

Referring to FIG. 8B, if the viewpoint indicator is located at a current point, the second zone 416 can indicate that the viewpoint indicator 410 is located (e.g., 'current') at the current point. Moreover, in response to an attempt to change the direction indicated by the viewpoint indicator 410 in FIG. 8A or FIG. 8B, if a user selects one of the direction setters 411 to 414 that is not the direction setter corresponding to the currently indicated direction, the mobile terminal 100 changes the direction indicated by the viewpoint indicator 410 into a direction corresponding to the selected direction setter. Therefore, as the direction indicated by the viewpoint indicator 410 is changed, a virtual image corresponding to the changed direction can be displayed.

Figure 9A:
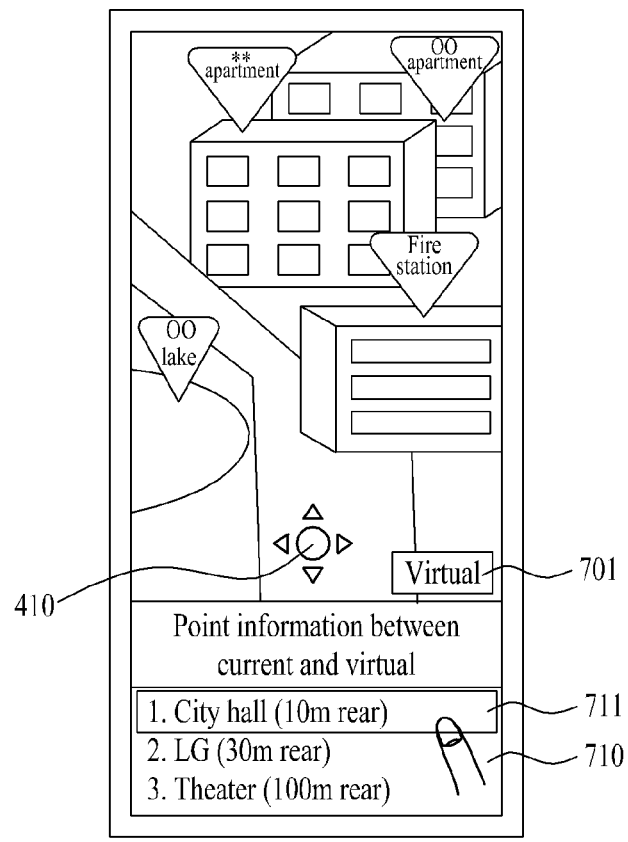
FIG. 9A and FIG. 9B are views of screen configurations illustrating shifting of a viewpoint indicator to a point corresponding to location information selected from a location information list according to an embodiment of the present invention.
Figure 9B:
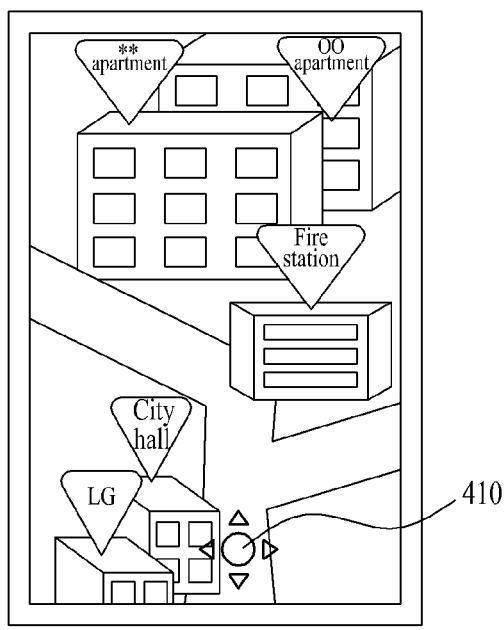

A procedure for shifting a viewpoint indicator to a point corresponding to location information selected from a location information list is described with reference to FIG. 9A and FIG. 9B. FIG. 9A and FIG. 9B are diagrams of screen configurations for shifting a viewpoint indicator to a point corresponding to location information selected from a location information list according to an embodiment of the present invention.

Referring to FIG. 9A, if a viewpoint indicator 410 is shifted to a virtual point, the mobile terminal 100 displays a virtual image including the viewpoint indicator 410 and a list 710 including location information belonging to a range between a current point (e.g., the current location of the mobile terminal) and the virtual point. Referring to FIG. 9B, if a user selects a specific piece of location information (i.e., 'City hall') from the list 710, the mobile terminal 100 shifts the viewpoint indicator 410 to an object image corresponding to the 'City hall' and then displays the virtual image with reference to the viewpoint indicator 410 having been shifted to the object image corresponding to the 'City hall'. According to one embodiment, the virtual image with reference to a second virtual point is displayed if a shift is made to the second virtual point from a first virtual point.

Figure 10A:
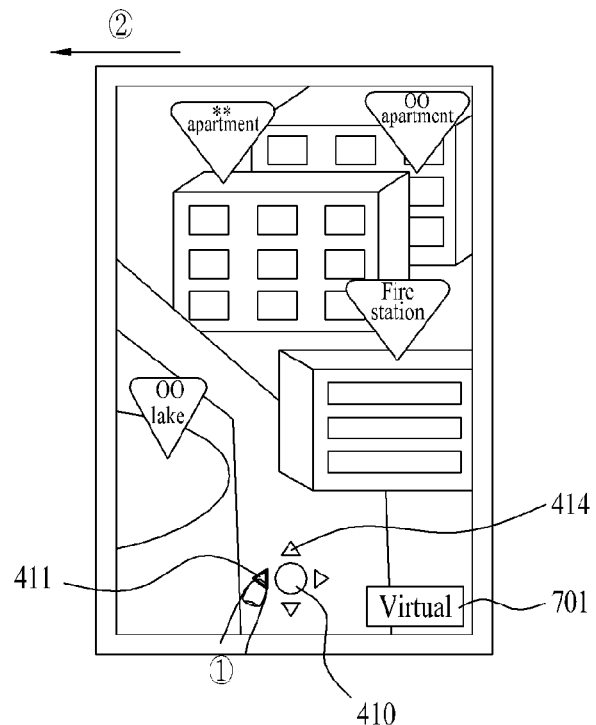
FIG. 10A and FIG. 10B are views of screen configurations illustrating changing of a direction indicated by a viewpoint indicator according to an embodiment of the present invention.
Figure 10B:
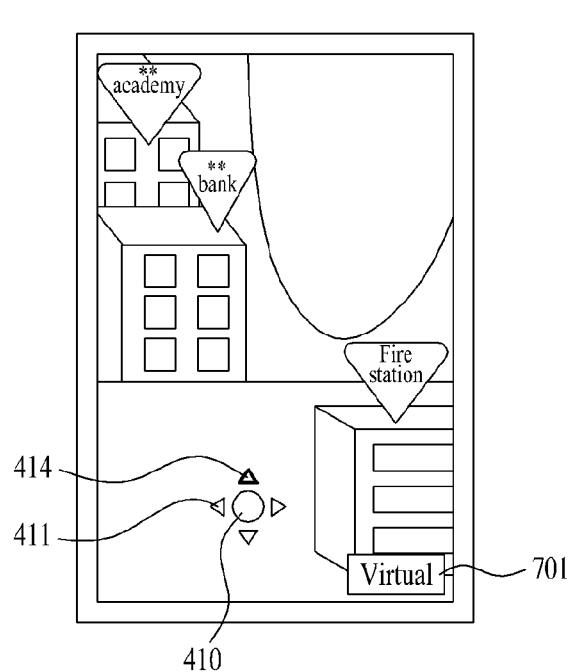

A procedure for changing a direction indicated by a viewpoint indicator is described with reference to FIG. 10A and FIG. 10B. FIG. 10A and FIG. 10B are diagrams of screen configurations for changing a direction indicated by a viewpoint indicator according to an embodiment of the present invention. For convenience of description, the following description corresponds to a situation in which a direction currently indicated by a viewpoint indicator is 'north' and the direction of 'north' is changed into 'west'.

Referring to FIG. 10A, in response to receiving a user selection action for a direction setter 411 corresponding to 'west' (see numeral "1" enclosed by a circle), the mobile terminal 100 changes a direction indicated by a viewpoint indicator 410 into west from north. Alternatively (or in addition), referring to FIG. 10A, in response to detecting a movement of the terminal in a left direction or a terminal inclining action in a left-down direction (see numeral "2" enclosed by a circle), the mobile terminal 100 changes a direction indicated by the viewpoint indicator 410 into west from north. Alternatively (or in addition), in response to detecting a shaking action of the terminal in a left direction, the same operation can be performed.

With reference to FIG. 10B, the mobile terminal 100 rotates the viewpoint indicator 410 by 90 degrees clockwise such that the viewpoint indicator 410 faces a westward direction. The mobile terminal 100 is then able to display a virtual image corresponding to the direction indicated by the rotated viewpoint indicator 410.

The direction indicated by the viewpoint indicator 410 can be set or changed into any combination of south, east, west and north as well as southeast, southwest, northeast and northwest. Optionally, a more detailed angle of the direction relative to the south, east, west or north directions may be set. Although the direction-changing features are described with reference to the virtual image of FIGS. 10A and 10B, it is appreciated that these features are applicable to a real image as well.

Figure 11A:
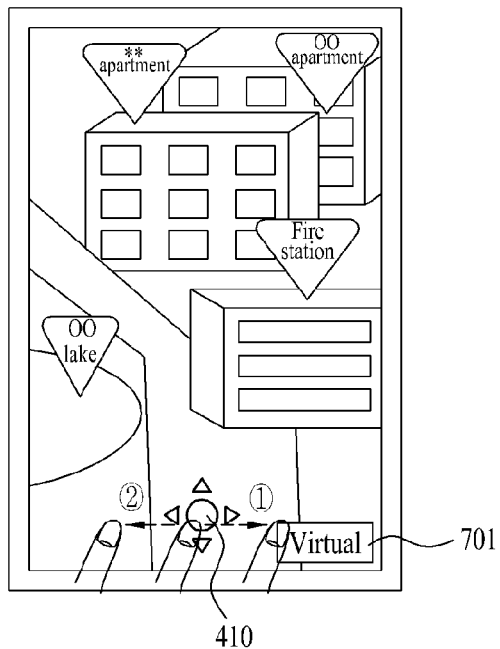
FIGS. 11A, 11B and 11C are views of screen configurations illustrating zooming in/out a viewpoint indicator according to an embodiment of the present invention.
Figure 11B:
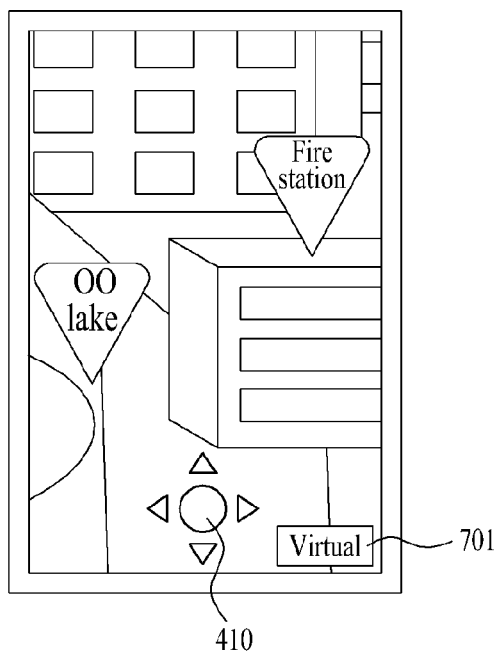
Figure 11C:
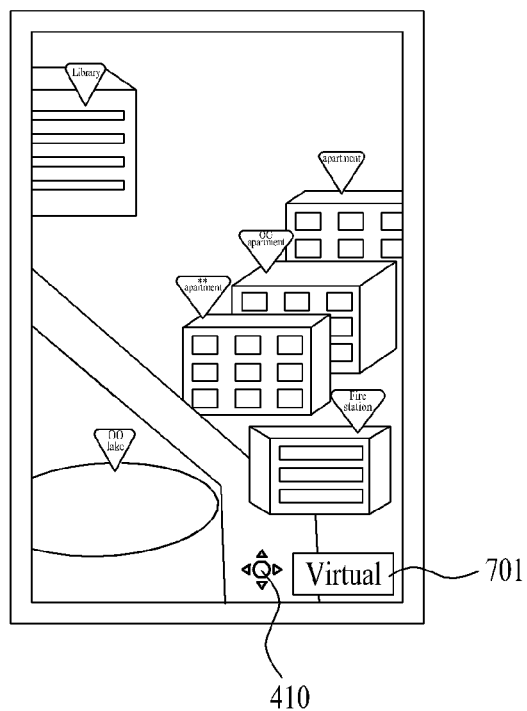

A method of zooming in or out a viewpoint indicator to display is explained with reference to FIGS. 11A to 11C. FIGS. 11A to 11C are diagrams of screen configurations for zooming in/out of a display according to an embodiment of the present invention. Although the zooming features are described with reference to the virtual image of FIGS. 11A, 11B and 11C, it is appreciated that these features are also applicable to a real image.

Referring to FIG. 11A, in response to receiving a touch & drag action performed in a right direction by a user, the mobile terminal 100 generates a zoom-in command signal of a viewpoint indicator 410. In response to receiving a touch & drag action performed in a left direction by a user, the mobile terminal 100 generates a zoom-out command signal of the viewpoint indicator 410. As a touch & drag distance increases, a zoom-in/out extent (or degree) can increase as well.

In addition to the above-mentioned actions, actions having touch patterns that are opposite each other can generate zoom-in and zoom-out command signals. For instance, in case of a proximity touch, if a proximity touch distance increases such that it is greater than a reference distance, the terminal generates a zoom-out command signal. If a proximity touch distance decreases such that it is less than a reference distance, the terminal generates a zoom-in command signal.

Referring to FIG. 11B, if a zoom-in command signal is generated, the viewpoint indicator 410 can be zoomed in to a zoom-in degree corresponding to a touch & drag distance in a right direction. Also, a virtual image can be zoomed in to correspond to the zoom-in degree of the viewpoint indicator 410. For instance, if the zoom-in extent is 200%, a virtual image can be enlarged to be twice its original size.

Referring to FIG. 11C, if a zoom-out command signal is generated, the viewpoint indicator 410 can be zoomed out to a zoom-out degree corresponding to a touch & drag distance in a left direction. Also, a virtual image can be zoomed out to correspond to the zoom-out degree of the viewpoint indicator 410. For instance, if a zoom-out extent is 50%, the virtual image can be reduced to ½ of its original size.

Figure 12A:
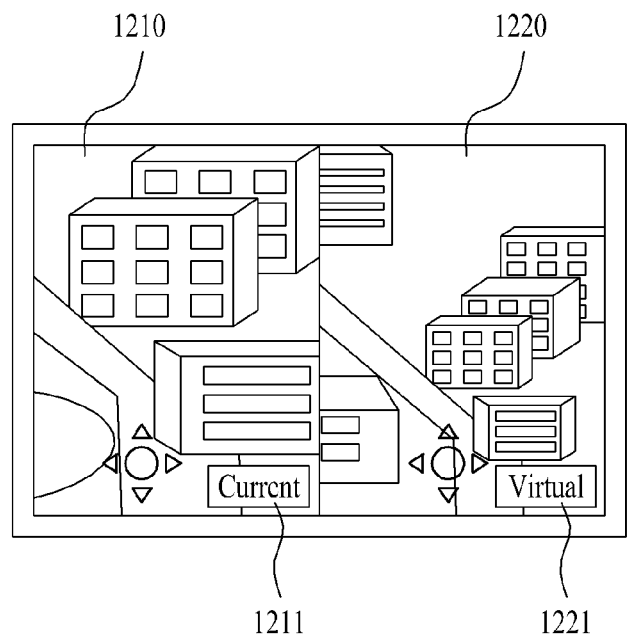
FIG. 12A and FIG. 12B are views of screen configurations displaying a plurality of images corresponding to respective directions indicated by a plurality of viewpoint indicators according to an embodiment of the present invention.
Figure 12B:
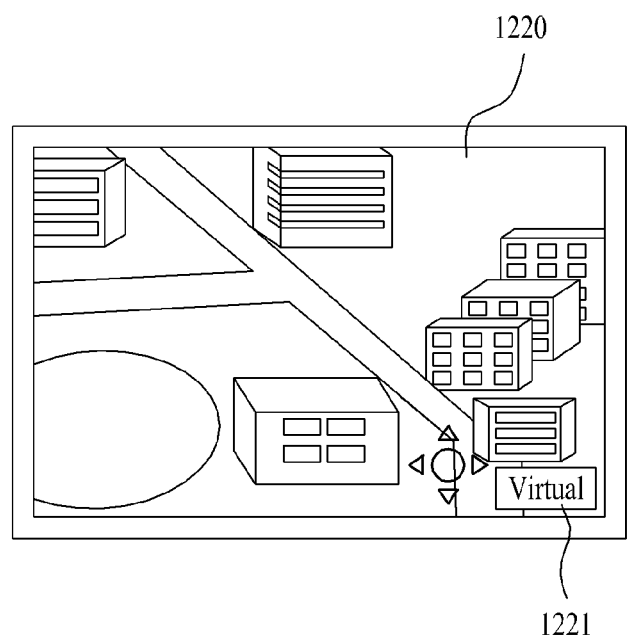

A procedure for displaying a plurality of images corresponding to respective directions indicated by a plurality of viewpoint indicators, is described with reference to FIG. 12A and FIG. 12B. FIG. 12A and FIG. 12B are diagrams of screen configurations for displaying a plurality of images corresponding to respective directions indicated by a plurality of viewpoint indicators according to an embodiment of the present invention.

Referring to FIG. 12A, if a viewpoint indicator 410 is shifted to a virtual point from a current point, the mobile terminal 100 divides the screen into a plurality of regions including a first region 1210 and a second region 1220. The mobile terminal 100 then displays a real image corresponding to the current point and a virtual image corresponding to the virtual point on the first region 1210 and the second region 1220, respectively.

An icon 1211 indicating that the image is real is displayed in the real image corresponding to the current point, and another icon 1221 indicating that the image is virtual is displayed in the virtual image corresponding to the virtual point. Respective viewpoint indicators can be displayed in the real and virtual images.

If a viewpoint indicator is shifted to a second virtual point from a first virtual point or a plurality of virtual points (e.g., the first virtual point and the second virtual point) are selected, the mobile terminal 100 displays a first virtual image corresponding to the first virtual point on the first region 1210 and displays a second virtual image corresponding to the second virtual point on the second region 1220. Respective viewpoint indicators can be displayed in the virtual images.

Referring to FIG. 12B, in response to receiving a command for displaying an entire virtual or real image from a user, the mobile terminal 100 displays the image on the entire screen. For example, with reference to FIG. 12B, the virtual image is displayed on the entire screen, and the real image may be displayed in the background or may not be displayed at all.

For instance, a command action for displaying a virtual or real image on an entire screen can include a touch action performed on an image which a user desires to view on the entire screen. According to other embodiments, the command action includes an action of selecting a corresponding menu item or a corresponding key zone.

Figure 13A:
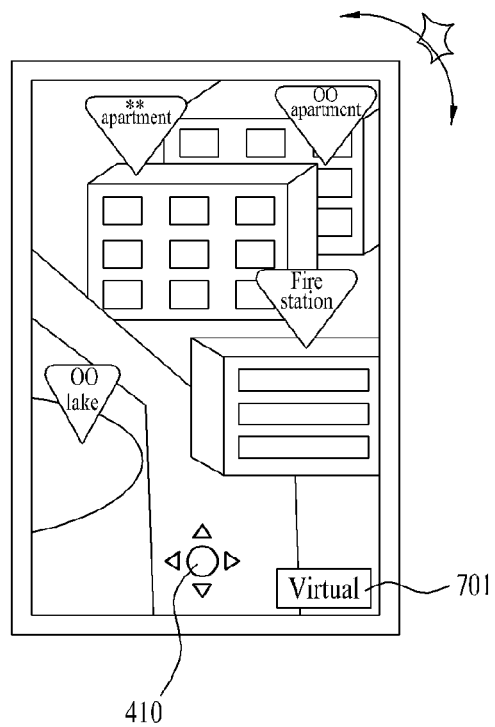
FIG. 13A and FIG. 13B are views of screen configurations illustrating stopping display of location information according to an embodiment of the present invention.
Figure 13B:
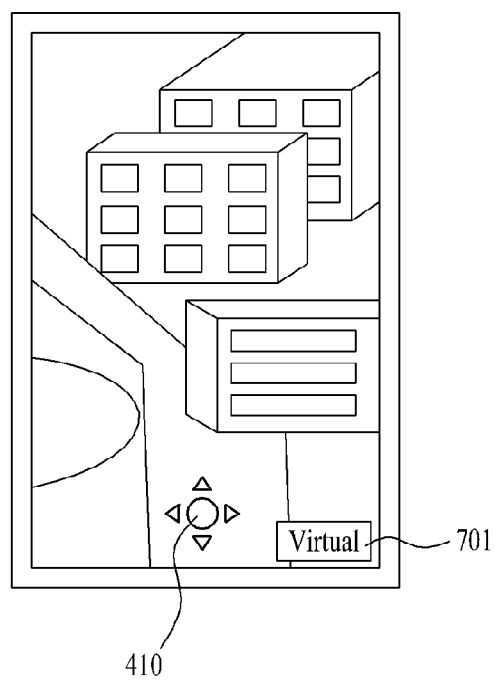

A procedure for ceasing the displaying of location information is described with reference to FIG. 13A and FIG. 13B. FIG. 13A and FIG. 13B are diagrams of screen configurations for ceasing displaying location information according to an embodiment of the present invention.

In response to detecting a predetermined number of shaking actions (causing the terminal to be shaken) (see, for example, FIG. 13A), the mobile terminal 100 may temporarily not display all or at least some location information included within a real or virtual image (see, for example, FIG. 13B). According to one embodiment, the location information that is included within a real or virtual image but is not displayed can be selected by a user in advance. After a predetermined duration (during which the display of the location information is ceased) has expired, the mobile terminal 100 returns to a state of displaying all location information (see, for example, FIG. 13A).

Figure 14:
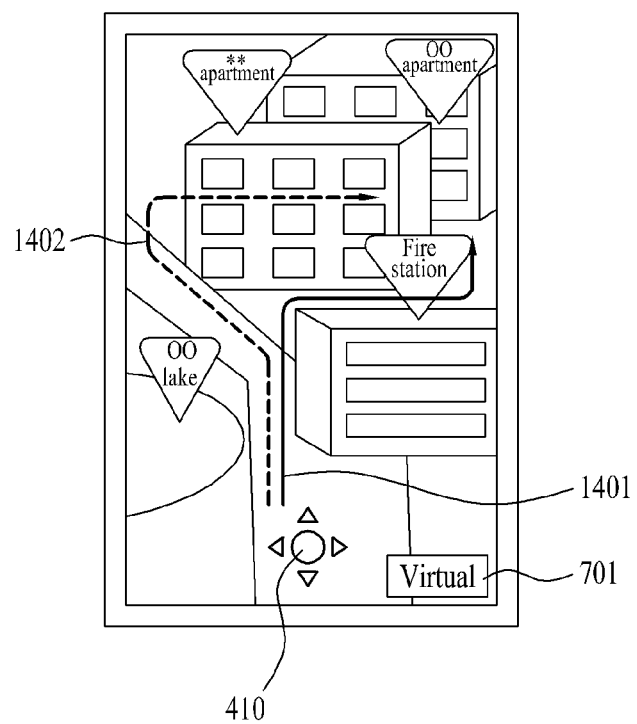
FIG. 14 is a view of a screen configuration illustrating providing path information on a path from a viewpoint indicator to a specific object image according to an embodiment of the present invention.

A procedure for providing path information on a path to a specific object image from a viewpoint indicator is described with reference to FIG. 14. FIG. 14 is a diagram of a screen configuration for providing path information regarding a path from a viewpoint indicator to a specific object image according to an embodiment of the present invention.

Referring to FIG. 14, if a user selects a specific object image, the mobile terminal 100 provides path information regarding a path to the specific object image from a viewpoint indicator 410 within a virtual or a real image. If a plurality of such paths exists, the mobile terminal 100 provides all of the paths.

The mobile terminal 100 displays a plurality of paths such that a path 1401 having a high frequency of use and a path 1402 having a low frequency of use are visually distinguishable from each other. In order to distinguish the paths 1401 and 1402 from each other, the mobile terminal may use various thicknesses of a path indication line, or various colors of the path indication line. If a plurality of object images are included within a virtual or real image, path information regarding a path to an object having high frequency of use (or a high frequency of being visited) among the plurality of objects corresponding to a plurality of the object images can be displayed automatically or in a visually distinguishable manner.

Figure 15A:
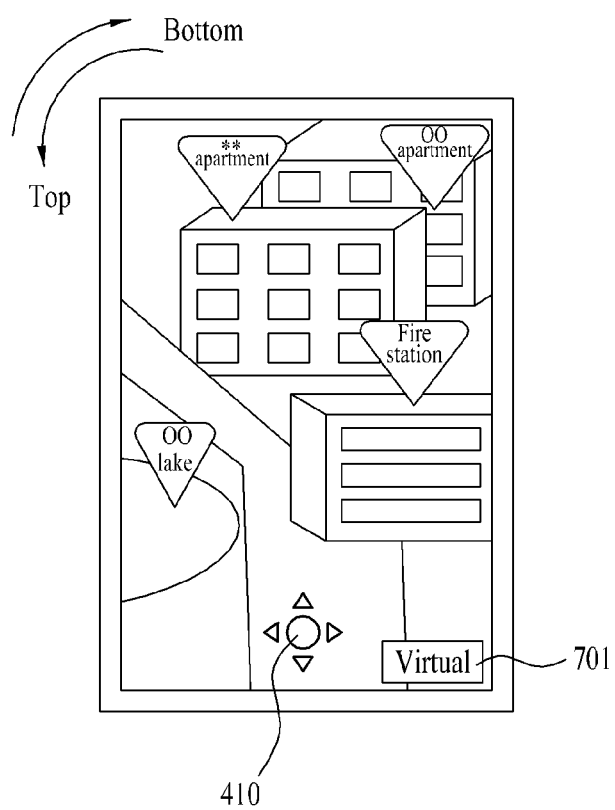
FIGS. 15A, 15B and 15C are views of screen configurations providing additional information in accordance with an incline angle of a terminal according to an embodiment of the present invention.
Figure 15B:
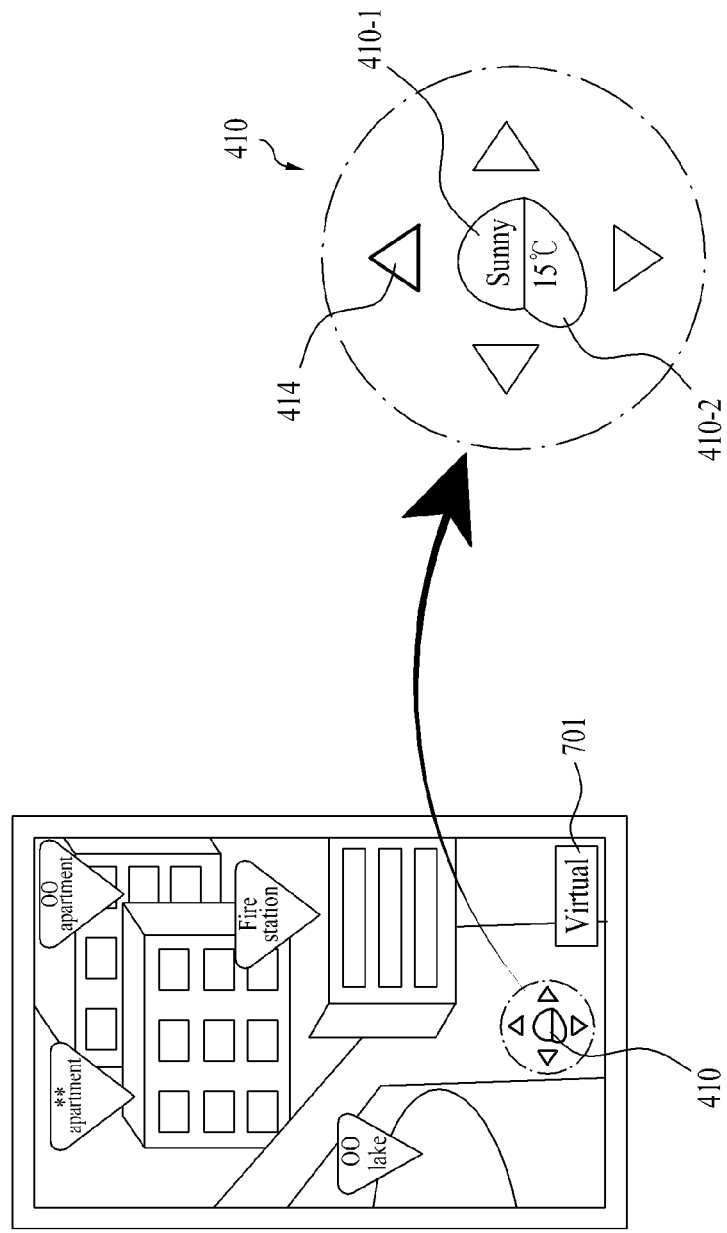
Figure 15C:
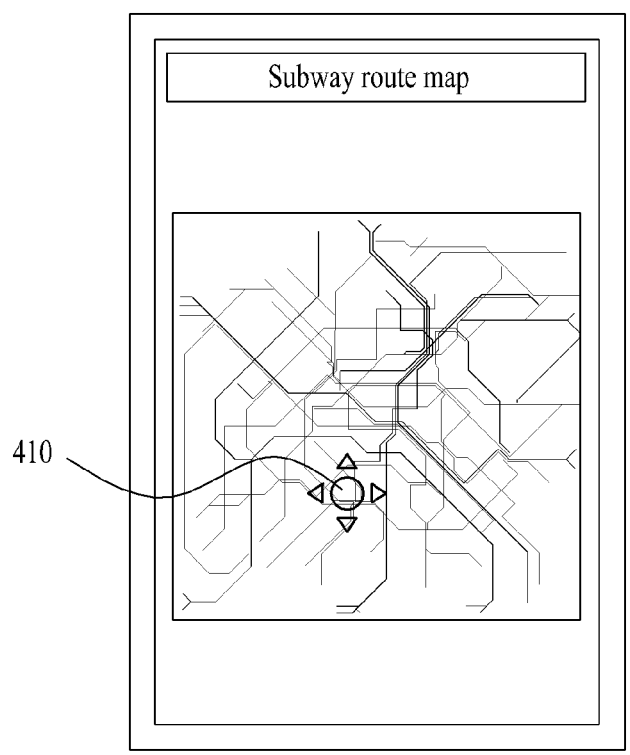

A procedure for providing additional information in accordance with an incline angle of a terminal is explained with reference to FIGS. 15A to 15C. FIGS. 15A to 15C are diagrams of screen configurations for providing additional information in accordance with an incline angle of a terminal according to an embodiment of the present invention.

Referring to FIG. 15A, the mobile terminal 100 is inclined in a top or bottom direction according to a predetermined angle with reference to a top side of the mobile terminal 100. Referring to FIG. 15B, in response to detecting a top-direction inclining motion, the mobile terminal 100 displays current weather information on a first region 410-1 (or a second region 410-2) of a viewpoint indicator 410. Referring to FIG. 15C, when detecting a bottom-direction motion, the mobile terminal 100 displays a subway route map with reference to a current location of the mobile terminal 100.

According to further embodiments, the mobile terminal 100 may provide additional information according to an inclining direction (e.g., top, bottom, left, right, etc.). For example, the mobile terminal 100 may provide additional information according to differing incline angles in a particular direction.

For instance, if the incline angle is 10-20 degrees in a top direction, the mobile terminal 100 may provide breaking news. If the incline angle is 20-30 degrees in a top direction, the mobile terminal 100 may provide stock market information. If the incline angle is 30 degrees or more in a top direction, the mobile terminal 100 may provide weather information.

Figure 16A:
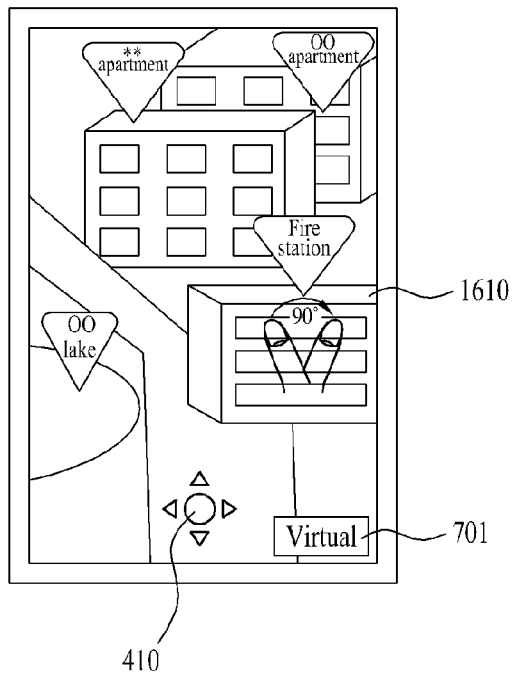
FIG. 16A and FIG. 16B are views of screen configurations illustrating shifting a position of a view point indicator using a specific object image according to an embodiment of the present invention.
Figure 16B:
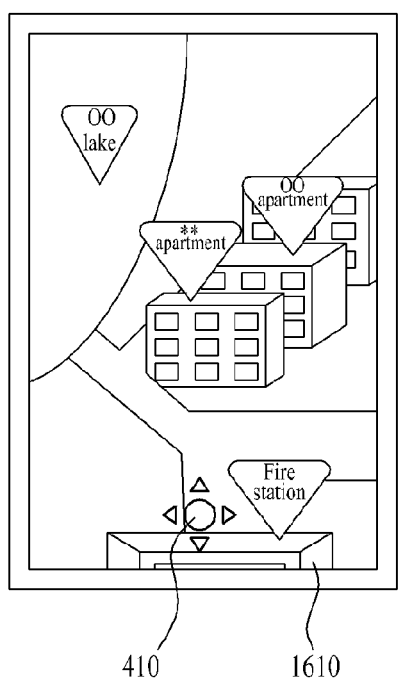

A procedure for shifting a position of a view point indicator using a specific object image is described with reference to FIG. 16A and FIG. 16B. FIG. 16A and FIG. 16B are diagrams of screen configurations for shifting a position of a view point indicator using a specific object image according to an embodiment of the present invention.

Referring to FIG. 16A, a user inputs a rotation command signal for rotating a specific object image 1610 included in a real or virtual image. Referring to FIG. 16B, in response to receiving a rotation command signal for rotating the specific object image 1610 shown in FIG. 16A by 90 degrees in a clockwise direction, the mobile terminal 100 shifts a viewpoint indicator 410 from a first part of the specific object image 1610 currently viewed on the screen to a second part corresponding to the rotation of 90 degrees clockwise and then displays a virtual image viewed with reference to the shifted viewpoint indicator 410.

The above-mentioned virtual image can include an image photographed at a virtual point by a counterpart terminal and can include an image received by the mobile terminal 100. Moreover, the virtual image can be transmitted to the counterpart terminal. In doing so, location information included in the transmitted virtual image and path information on a path to a specific object can be transmitted together.

Embodiments of the present invention provide various effects and/or features. First of all, if a terminal is virtually located in a specific area, the terminal is able to provide a user with object relevant information regarding at least one object included in the specific area even if the terminal is not truly located in the specific area. Secondly, the terminal displays a viewpoint indicator indicating a location and orientation of a terminal within a real or virtual image, thereby enabling a user to recognize the orientation of the terminal and a point or location at which the terminal is located actually or virtually.

The disclosed image displaying can be implemented in a program recorded medium as computer-readable codes. The computer-readable media may include all kinds of recording devices in which data readable by a computer system are stored. The computer-readable media include ROM, RAM, CD-ROM, magnetic tapes, floppy discs, and optical data storage devices, for example, and also include carrier-wave type implementations (e.g., transmission via Internet).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a camera module for capturing an image;
a display unit for displaying the captured image and a first viewpoint indicator on the captured image, the first viewpoint indicator displayed at a first point corresponding to first information and indicating a direction, the first information indicating a current location of the mobile terminal; and
a controller configured to:
control the display unit to shift the display of the first viewpoint indicator to a second point corresponding to a shift command signal;

in response to detecting the shift command signal, divide a screen of the display unit into a first region and a second region;

simultaneously display, in the first region, the first viewpoint indicator at the first point on the captured image and, in the second region, second information regarding at least one entity oriented about the mobile terminal along a direction indicated by the shifted first viewpoint indicator; and when either the first region or the second region is selected, control the display unit to fully display the selected region, wherein the second information comprises a virtual image taken at a geographical location corresponding to the shifted first viewpoint indicator and a second viewpoint indicator displayed on the virtual image, the second viewpoint indicator displayed at the second point, and wherein the second viewpoint indicator comprises a first zone indicating a radius of the virtual image and a second zone indicating a shifted distance from the first point.

2. The mobile terminal of claim 1, wherein the second information further comprises at least a virtual image illustrating the at least one entity or information regarding a location of the at least one entity.

3. The mobile terminal of claim 1, further comprising a wireless communication unit for transmitting a request signal to an external server under control by the controller in order to request the second information, and for receiving the requested second information.

4. The mobile terminal of claim 1, further comprising a memory for storing location information, wherein the controller is configured to search the stored location information to obtain the second information.

5. The mobile terminal of claim 1, wherein the controller controls the display unit to display information regarding the at least one entity located between the first point and the second point if the command signal is for shifting the first viewpoint indicator from the first point to the second point.

6. The mobile terminal of claim 1, wherein:
the controller controls the display unit to shift the display of the first viewpoint indicator to a point corresponding to a selection from the displayed second information.

7. The mobile terminal of claim 1, wherein:
the controller controls the display unit to change the direction indicated by the first viewpoint indicator according to a change command signal for changing the direction indicated by the first viewpoint indicator and to display information regarding the at least one entity oriented about the mobile terminal along the changed direction indicated by the first viewpoint indicator.

8. The mobile terminal of claim 1, wherein:
the controller is further for controlling the display unit to zoom in or out to display the first viewpoint indicator based on a size adjust signal for adjusting a size of the first viewpoint indicator.

9. The mobile terminal of claim 8, wherein:
the controller controls the display unit to reduce a periphery radius of the displayed image if the first viewpoint indicator is zoomed in; and
the controller controls the display unit to enlarge the periphery radius of the displayed image if the first viewpoint indicator is zoomed out.

10. The mobile terminal of claim 1, wherein the controller is further for controlling the display unit to display information indicating a path from the first viewpoint indicator to a specified one of the at least one entity.

11. A method of displaying an image in a mobile terminal, the method comprising:
receiving a captured image;
obtaining first information indicating a current location of the mobile terminal;
displaying the received image on a display unit;
displaying a first viewpoint indicator on the received image at a first point corresponding to the obtained first information, the first viewpoint indicator indicating a direction;
receiving an input of a shift command signal for shifting the display of the first viewpoint indicator;
shifting the display of the first viewpoint indicator to a second point corresponding to the input shift command signal;
in response to detecting the shift command signal, dividing a screen of the display unit into a first region and a second region;
simultaneously displaying, in the first region, the first viewpoint indicator at the first point and, in the second region, second information regarding at least one entity oriented about the mobile terminal along a direction indicated by the shifted first viewpoint indicator; and
when either the first region or the second region is selected, fully displaying the selected region,
wherein the second information comprises a virtual image taken at a geographical location corresponding to the shifted first viewpoint indicator and a second viewpoint indicator displayed on the virtual image, the second viewpoint indicator displayed at the second point, and
wherein the second viewpoint indicator comprises a first zone indicating a radius of the virtual image and a second zone indicating a shifted distance from the first point.

12. The method of claim 11, wherein the virtual image illustrates the at least one entity or information regarding a location of the at least one entity.

13. The method of claim 11, further comprising:
transmitting a request signal to an external server to request the second information; and
receiving the requested second information.

14. The method of claim 11, wherein the first information is stored in the mobile terminal, and the method further comprises searching the stored first information to obtain the second information.

15. The method of claim 11, further comprising obtaining third information regarding the at least one entity located within a predetermined distance of the mobile terminal along the indicated direction, wherein displaying the second information comprises displaying the obtained third information within the virtual image together with an image of the at least one entity located within the predetermined distance.

16. The method of claim 11, further comprising:
receiving a change command signal for changing the direction indicated by the first viewpoint indicator;
changing the direction indicated by the first viewpoint indicator to a direction corresponding to the received change command signal; and
displaying the second information corresponding to the at least one entity oriented about the mobile terminal along the direction corresponding to the received change command signal.

17. The method of claim 11, further comprising displaying information indicating a path from the first viewpoint indicator to a specified one of the at least one entity.

* * * * *